May 12, 1964     A. H. BORMAN, JR., ETAL     3,132,535
TRANSMISSION
Filed Sept. 20, 1960     3 Sheets-Sheet 1
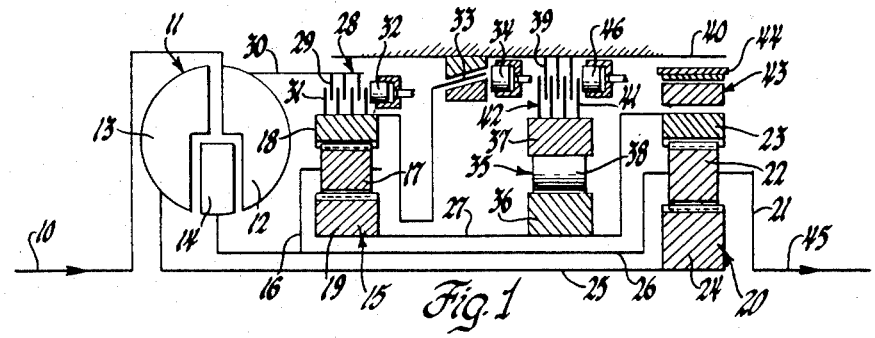
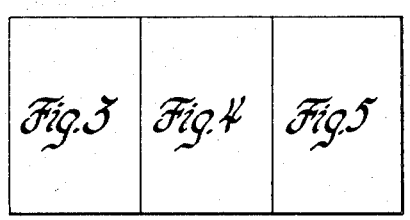
Fig.2
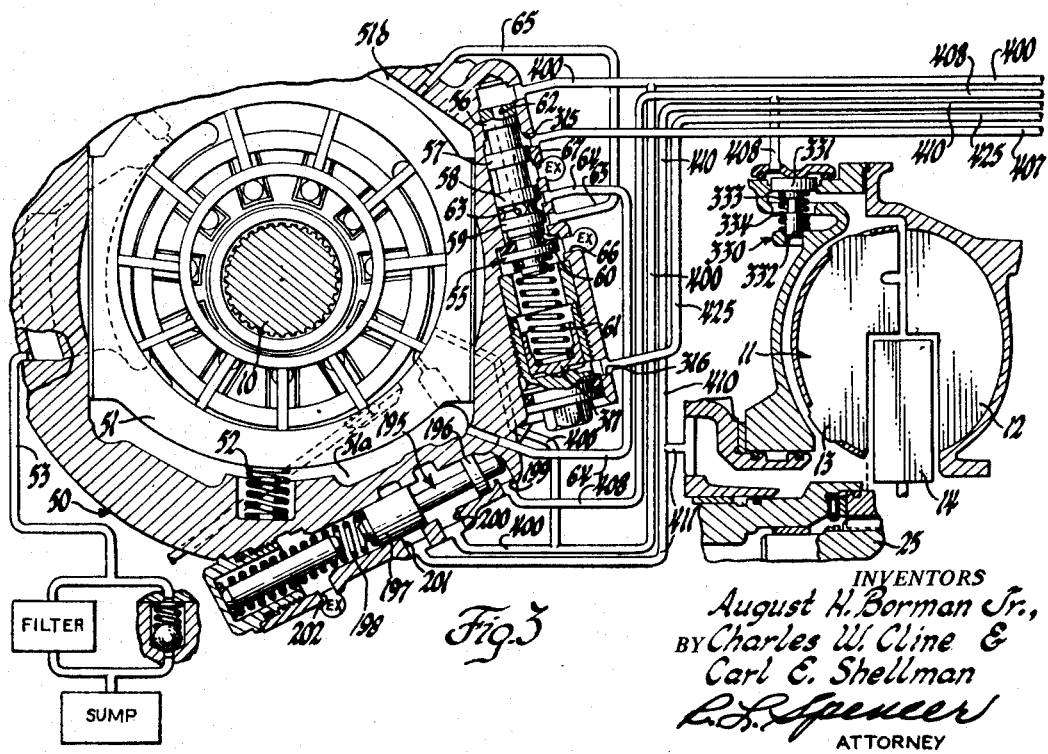
INVENTORS
August H. Borman Jr.,
BY Charles W. Cline &
Carl E. Shellman
ATTORNEY

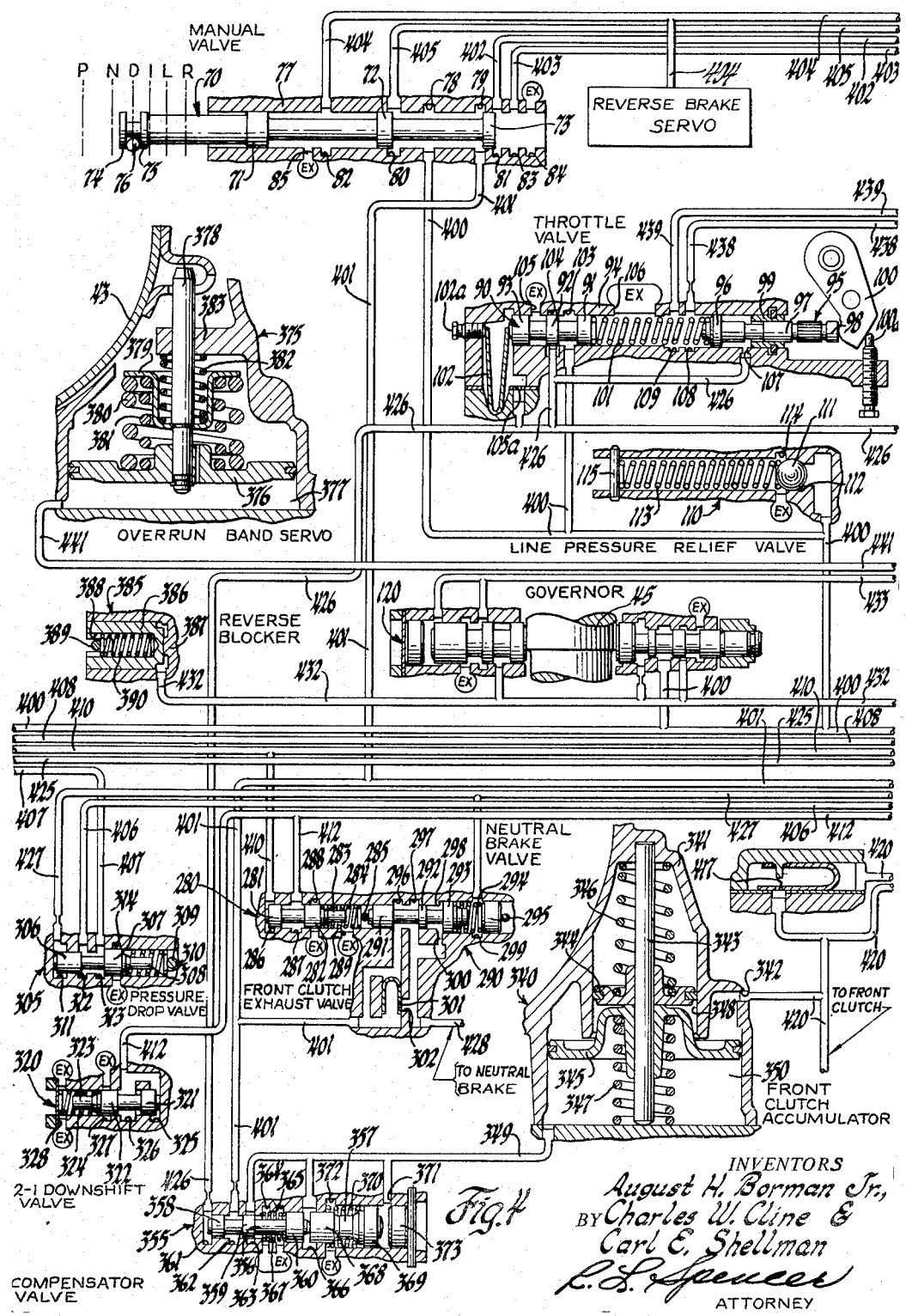

3,132,535
TRANSMISSION
August H. Borman, Jr., Detroit, Charles W. Cline, Livonia, and Carl E. Shellman, Detroit, Mich., assignors to General Motors Corporation, Detroit, Mich., a corporation of Delaware
Filed Sept. 20, 1960, Ser. No. 57,189
18 Claims. (Cl. 74—688)

This invention relates to automatic transmissions, and particularly to plural step ratio transmissions adapted, although not exclusively, for use with motor vehicles.

The invention contemplates the provision of a plural step ratio transmission of a simplified and compact design which may be easily arranged for installation in a vehicle either adjacent the engine at the front of the vehicle or adjacent the rear axle without consuming excessive space and which is capable of providing for good performance and efficiency.

Moreover, the invention provides a transmission which utilizes planetary gear units advantageously to reduce the need for compounding thereby reducing gear noise.

The invention further provides for fluid drive start and particularly includes a plural turbine fluid drive unit wherein one of the turbines is continuously directly connected to the output shaft of the transmission.

To obtain the desired drive ratios without complicated compounding of the planetary gear units, plural drive trains are provided, each employing a single gear unit with the drive to each gear unit being controlled by an appropriate torque transmitting device. Because of the fluid start requirement, one of the drive trains includes a hydrodynamic torque transmitting device effective to commence vehicle movement, while the other drive trains employ friction devices. To provide good performance, the fluid drive unit includes a first turbine connected to one element of one gear unit and a second turbine connected to a second element of each of the two gear units and to the transmission power delivery or output shaft. To reduce fluid losses as well as to change the drive from one train to the other for needed ratio coverage, the hydrodynamic torque transmitting member is alternately emptied and refilled with working fluid. To provide optimum performance and smoothness of operation, this hydrodynamic torque transfer unit requires the emptying and filling to be at different rates under different operating conditions. Provision for varying the rate of coupling fill is made by the inclusion of a restricted coupling feed supply and a second coupling feed supply which may, at times, be effective to provide unrestricted supply of fluid to the coupling. The unrestricted supply of fluid to the coupling is accompanied by a rise in line pressure over that maintained when the restricted supply to the coupling is alone effective.

An additional feature of this invention is the inclusion of means for controlling the rate of engagement of the front unit clutch in accordance with changes in engine torque as distinguished from engine torque demand. This is accomplished by the inclusion of an accumulator associated with the front clutch, a compensator valve calibrated to deliver variable pressure to the accumulator wherein the pressure changes in compensator pressure closely approximate changes in engine torque, and controlling the compensator valve by a throttle valve adapted to deliver variable pressure in accordance with changes in engine torque demand.

Another feature of this invention is to provide a pressure boost valve and a pressure drop valve associated with the line pressure regulator valve and operable under different conditions of operation to modify the line pressure ranges of pressure delivered by the line pressure regulator valve.

A further feature of this invention is the provision of a second to first gear cut off valve effective in the event of a panic stop of the vehicle to provide a rapid exhaust of the front clutch to prevent engagement of the front clutch when the vehicle is stopped.

Another feature of this invention is the provision of a neutral clutch valve controllable in response to torque demand for providing smooth engagement of the neutral clutch and at the same time being controlled in its action to prevent excess clutch slippage under conditions of heavy torque demand.

An additional feature of this invention is the provision of a front clutch exhaust valve operable in a normal second to first gear downshift and responsive to fluid coupling pressure to connect the front clutch to exhaust after the coupling is effective to carry the load.

Still another feature of this invention is the provision of a second to first gear downshift valve responsive to front clutch exhaust pressure on a second to first gear downshift to provide an initial rapid exhaust of clutch pressure when the clutch pressure exceeds a predetermined pressure and to block off exhaust of clutch pressure through the valve when the clutch pressure drops to said predetermined pressure.

A further feature is the provision of a second to third gear pressure boost valve controlled by the second to first gear cut off valve and effective on a light throttle shift from second to third gear to provide a boost in line pressure to provide rapid fill of the coupling.

The control system is arranged to assure that the transmission will be operative in drive range first gear operation in the event that the coupling timing valve or pressure boost valve of the system should accidentally become stuck in an improper position by the inclusion of safety features which will render the transmission operative.

The control system is further arranged to assure that the transmission will be operative in reverse in the event that the coupling timing valve should accidentally become stuck in an improper position by the inclusion of safety features.

The above referred to safety features are not normally operative but are present to make possible operation either in low gear or reverse so that the transmission will not be rendered inoperative due to improper functioning of the coupling timing valve or line boost valve. Ball check valves are provided which automatically prevent slipping of the reverse cone and neutral brake as would otherwise occur in the event that the line boost valve should become stuck in an improper position so as to permit an undesirable low line pressure to exist in the control system.

These and other features and advantages of this invention will be apparent from the following description and claims, taken in conjunction with the accompanying drawings, in which:

FIGURE 1 is a schematic diagram of a transmission adapted for use with a control system as described.

FIGURE 2 is a block formation illustrating the proper assembly arrangement for FIGURES 3, 4 and 5.

FIGURE 3 is a schematic diagram of a pump and hydrodynamic torque transmitting device.

FIGURE 4 is a schematic diagram of a portion of the control system.

Figure 5:
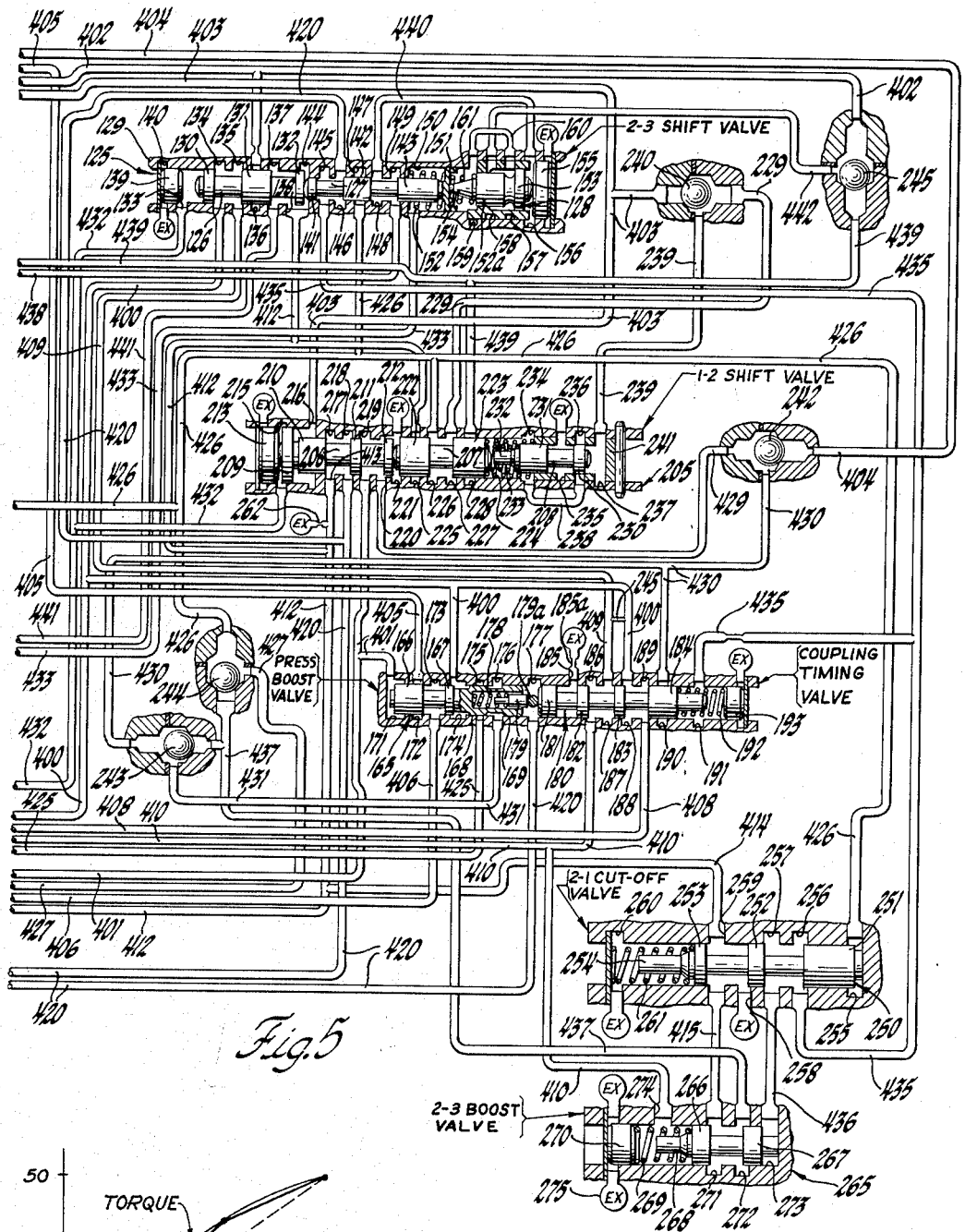
FIGURE 5 is a schematic diagram of a second portion of the control system.

Referring to FIGURE 1, the transmission, illustrated schematically, has an engine driven power input shaft 10 adapted to drive an impeller 12 of a hydrodynamic torque transmitting device 11, having first and second turbines 13 and 14. A front planetary gear unit 15 includes a planet carrier 16 supporting a plurality of pinion gears 17 in mesh with a ring gear 18 and a sun gear 19. A rear unit 20 consists of a planet carrier 21 supporting a plurality of planet pinions 22 in mesh with a ring gear 23 and a sun gear 24. First turbine 13 is directly connected to sun gear 24 by a shaft 25. Second turbine 14 is directly connected to the planet carriers 16 and 21 by means of a hollow sleeve shaft 26. Since planet carrier 21 is directly connected to output shaft 45, the turbine 14, planet carrier 16, carrier 21, and output shaft 45 all rotate as a unit. As hereafter more fully explained, the turbine 14 in low gear causes the hydrodynamic torque transmitting device to function as a torque converter or torque multiplying device. In second gear, the hydrodynamic torque transmitting device 11 is empty and in third drive ratio the hydrodynamic torque transmitting device functions as a fluid coupling without torque multiplication. Sun gear 19 is directly connected to ring gear 23 for rotation therewith by means of a sleeve shaft 27.

A front unit clutch 28 includes a set of clutch discs 29 axially slidable on a clutch drum 30 driven by input shaft 10, and a set of clutch discs 31 slidable on ring gear 18 and rotatable with the ring gear. A piston 32 may receive fluid pressure to engage the clutch. A cone brake 33 is connected to ring gear 18 and may be engaged by a piston 34 for reverse drive.

A one-way brake 35 comprises an inner race 36, an outer race 37 and rollers 38 disposed between the races 36 and 37, the race 36 being fixed for rotation with sleeve shaft 27. A plurality of brake discs 39 are axially slidable on fixed housing 40, the discs 39 being non-rotatable. A plurality of brake discs 41 are axially slidable on outer race 37 and rotatable with the race. The one-way brake 35 may be rendered effective or ineffective by brake discs 39 and 41, by controlling the admission of fluid pressure to or exhaust of pressure from a neutral brake 42 having a piston 46. An overrun brake 43 comprises a brake band 44 which may be applied to ring gear 23 to prevent rotation of the ring gear in any direction. The band 44 may be applied by admitting fluid pressure to a band actuating servo, not shown. The brake 43 may be termed an overrun brake.

*Operation of General Arrangement*

The transmission so far described affords neutral, three forward gear ratios and a reverse.

For neutral, the neutral brake servo piston 46 is released so that neither the front gear unit 15 nor rear gear unit 20 has a reaction point and power cannot be transmitted to power delivery shaft 45. Hydrodynamic torque transmitting device 11 is filled with working fluid in neutral. Due to the load of the vehicle upon planet carriers 16 and 21 and upon turbine 14, the carriers and turbine 14 will not rotate. Turbine 13 may rotate and drive sun gear 24 causing ring gear 23 and sun gear 19 to spin. Ring gear 18 will likewise spin freely.

For first gear operation the hydrodynamic torque transmitting unit 11 is filled with working fluid and neutral brake 42 is engaged. Upon acceleration of impeller 12 by speeding up the engine, turbine 13 will initially begin to rotate sun gear 24 of the rear gear unit. One-way brake 35 will prevent reverse rotation of ring gear 23. At this initial condition of operation, which may be termed "stall," the planet carrier 21 and turbine 14 will be either held against rotation or rotate slowly forwardly due to the load of the vehicle applied to shaft 45. Turbine 14 will therefore re-direct fluid discharged from turbine 14 into impeller 12 such that the fluid entering impeller 12 tends to drive this impeller. Thus, at stall of the turbine 14, the unit 11 acts as a torque converter to multiply torque. Shaft 45 is driven at the torque multiplication of unit 11 and the torque multiplication of gear unit 20. As the output shaft 45 begins to rotate forwardly, turbine 14 also rotates forwardly and the torque multiplication through the unit 11 diminishes with increase in speed of rotation of turbine 14 while the torque multiplication of gear unit 20 remains constant. Unit 11 may reach a condition of operation wherein minimum torque multiplication is provided by unit 11 in first gear drive, but the torque multiplication of unit 11 will never drop to zero. Since turbine 14 can never attain the speed of rotation of turbine 13 in first gear drive due to the mechanical interlock with unit 20 gears, turbine 14 will act as a forwardly rotating reaction member to provide torque multiplication in unit 11.

For second speed drive, unit 11 is exhausted of fluid, clutch 28 is engaged and neutral brake 42 remains engaged. Ring gear 18 is driven at engine speed while one-way brake 35 prevents reverse rotation of sun gear 19. Planet carrier 16 of the front gear unit drives shaft 45 at the reduction ratio of front gear unit 15. In second speed drive no hydrodynamic losses occur since the drive is entirely mechanical and unit 11 is empty of fluid.

For direct drive, clutch 28 and brake 42 remain engaged while unit 11 is refilled with working fluid. Drive is transmitted through clutch 28 to ring gear 18, through turbine 13 to sun gear 24, and through turbine 14 to planet carriers 16 and 21. At this time turbines 13 and 14 will rotate at substantially the speed of rotation of impeller 12. It will be apparent therefore that ring gear 18 and planet carrier 16 of the front gear unit will each be driven substantially at engine speed and that the front gear unit will be locked up in direct drive. Also, since sun gear 24 and planet carrier 21 of the sun gear unit are each driven substantially at engine speed, the rear gear unit 20 will be locked up in direct drive.

To obtain reverse operation, reverse cone brake 33 is engaged while the other clutches and brakes are released. Fluid unit 11 is filled with working fluid. Ring gear 18 of the front gear unit 15 is held against rotation. Turbine 13 drives sun gear 24 of the gear unit 20 forwardly in the direction of rotation of impeller 12. Due to the vehicle load on the planet carriers 21 and 16, the carriers tend to remain stationary. Ring gear 23 and sun gear 19 therefore rotate reversely, since forward brake 42 is released. As a consequence, this backward rotation of front unit sun gear 19 will cause carrier 16 to rotate backwards at reduced speed. Turbine 14 also imparts rotation in a reverse direction to shaft 26. Output shaft 45 will therefore be driven in reduction drive through gear unit 15 and will have additional reverse torque applied thereto by turbine 14.

An overrun brake 43 may be applied to ring gear 23 to prevent either forward or reverse direction of rotation of ring gear 23 when desired. Brake 43 will be applied when the transmission is conditioned for intermediate range or low range operation in either first or second gear drive, and is particularly useful for establishing engine braking for slowing up the vehicle when descending long or steep grades.

*Control System*

The various brakes and clutches and the hydrodynamic torque transfer unit 11 are all operated in the proper sequence by the hydraulic control system shown schematically in the drawings. Each drive establishing device or servo may be of known construction employing a piston which by fluid pressure supplied to the servo is moved to its engaged position.

Fluid pressure for the system is supplied by a pump 50 shown in FIGURE 3, of the variable capacity type similar in function and detail to that shown in the application of Walter B. Herndon, S.N. 444,119, refiled July 19, 1954 and entitled Variable Capacity Pressure Systems, now Patent No. 2,875,699. Pump 50 has a guide member 51 adapted to slide up and down, as viewed, in a guideway in the pump body. The volume of fluid discharged depends upon the position of slide 51 in its guide. A spring 52 biases slide 51 to its maximum capacity position. Pump 50 is driven by power input shaft 10 so as to commence operation as soon as the engine is started. Fluid is driven from a suction passage 53 and discharged to a main supply passage 400.

Pressure Regulator Valve

For controlling the pressure of fluid discharged by pump 50 into main supply line 400, a pressure regulator valve 55 is slidable within a bore in the pump body and is furnished with pressure fluid by main supply line 400. Valve 55 includes a plurality of spaced valve lands 56, 57, 58, 59 and 60 and is biased upwardly by a spring 61 towards the maximum pressure position against the pressure of the fluid delivered by passage 400 to the top of valve 55. A passage 62 extends from the upper end of valve 55 through the center thereof and communicates with a cross passage 63 in the valve between the lands 58 and 59. In the position illustrated, pressure fluid from passage 400, acting on the upper face of valve 55 to urge it downwardly against spring 61, will be transferred by passages 62 and 63 to a passage 64 which communicates with a chamber 51a at the bottom of slide 51. A passage 65 communicating with a chamber 51b at the top of slide 51 is connected to exhaust through an exhaust port 66. Thus the pressure fluid at the bottom of slide 51, together with spring 61, urges slide 51 upwardly towards its maximum capacity position. As the fluid pressure in passage 400 increases, valve 55 will move downwardly, so that land 58 will permit flow of oil from passage 64 to exhaust port 67, and to align passage 63 with passage 65 leading to the top of slide 51. Pressure acting in chamber 51b at the top of slide 51 will urge it downwardly to reduce the volume of the pump output. Spring 61 is effective to normally cause valve 55 to maintain 105 pounds pressure in passage 400.

In the foregoing manner pressure regulator valve 55 will reciprocate between these two positions so as to supply fluid pressure either to chamber 51a at the bottom side of the slide 51 through passage 64 or to chamber 51b at the top side of the slide through passage 65. Consequently, slide 51 will be positioned so that the volume of fluid pumped is sufficient to produce the output pressure determined by pressure regulator spring 61. Pressure variations from the normal 105 pounds line pressure may be had as hereafter more particularly explained.

Manual Valve

Main supply passage 400 extends to a manually operable drive range control valve designated generally at 70 in FIGURE 4, which is slidable within a bore in the valve body and includes spaced lands 71, 72 and 73. A pair of flanges 74 and 75 are provided for receiving an actuating pin 76 which may be moved through linkage mechanism, not shown, operable by the vehicle driver to position the valve 70 for Park, Neutral, Drive Range, Intermediate Range, Low Range, or Reverse conditions of operation. Valve body 77 is provided with ports 78, 79, 80, 81, 82, 83, 84 and 85. Ports 84 and 85 are exhaust ports and the remainder of the ports connect to fluid passages as hereafter more fully explained.

Throttle Valve

Main pressure supply passage 400 extends to a throttle valve indicated generally at 90. Valve 90 comprises spaced lands 91, 92 and 93 slidable in a bore in valve body 94, see FIGURE 4. A second valve indicated generally at 95 which may be termed a detent valve, is slidable in the bore of valve body 94. Valve 95 has a land 96 thereon and a reduced portion 97 of less diameter than the valve bore. An extension 98 protrudes outwardly through a seal 99 at one end of the valve bore and is adapted to be acted upon by a cam 100 controlled by the vehicle accelerator pedal, not shown. A stop member 100a limits the counterclockwise rotation of cam 100 when the accelerator pedal is released. A spring 101 seats on land 96 of valve 95 and one one end of throttle valve 90. A U-shaped thermostatically operated calibrating spring 102 bears against the end of land 93 and a calibrating screw 102a in the end of the valve body 94.

The bore of the valve body is provided with ports 103, 104 and 105 associated with valve 90. Port 103 connects to line pressure supply passage 400 and port 104 connects to throttle valve pressure delivery passage 426. A restriction 105a permits throttle valve pressure from passage 426 to enter the chamber in which spring 102 is positioned at the end of land 93. An exhaust port 106 is located between land 91 of valve 90 and land 96 of valve 95 to assure that the chamber in which valve spring 101 is located cannot become filled with fluid due to leakage past the valve lands of either valve 90 or valve 95. The valve bore has ports 107, 108 and 109 therein associated with detent or part throttle valve 95.

In operation, assuming the accelerator pedal (not shown) is released, cam 100 will rotate counterclockwise to relax spring 101 and permit spring 102 to position throttle valve 90 such that land 92 blocks off throttle valve delivery passage 426 as shown. Land 96 of valve 95 will block off ports 108 and 109 from port 107. Assuming the accelerator pedal (not shown) is partly depressed, cam 100 will rotate slightly in a clockwise direction, moving valve 95 into the valve bore to load spring 101 and thereby apply a force to land 91 of valve 90. Valve 90 will connect line pressure supply passage 400 to throttle valve delivery passage 426. This pressure will enter the chamber at the left end of land 93 through restriction 105a and will also enter the valve bore through port 107 of valve 95. At slight throttle opening land 96 will block off port 107 from ports 108 and 109 connected to passages 438 and 439, respectively. Pressure acting on the end of land 93 will move throttle valve 90 to the right against the force of spring 101 until port 104 is connected to exhaust port 105. It will readily be understood that the pressure in passage 426 will increase as the accelerator pedal (not shown) is depressed to rotate cam 100 clockwise and will decrease as the accelerator pedal (not shown) is relaxed to permit cam 100 to rotate counterclockwise. This pressure is termed throttle valve pressure. As the cam 100 is rotated clockwise, the throttle valve pressure in passage 426 increases, and valve 95 moves to the left to consecutively uncover ports 108 and 109. At part throttle the port 108 is connected to port 107, to permit throttle valve pressure from passage 426 to enter part throttle TV passage 438. After full throttle opening is obtained by depression of the accelerator pedal (not shown) port 109 is connected to port 107 to permit throttle valve pressure to enter passage 439, which is termed a detent passage. At this time, the throttle valve pressure in passages 426, 438 and 439 will be maximum, or full line pressure. Throttle valve pressure is used for control purposes as hereafter more fully explained.

Line Pressure Relief Valve

Line pressure from line pressure supply passage 400 extends to a relief valve 110 shown in FIGURE 4 which comprises a ball 111 seated upon a seat 112 by a spring 113, the bore of the relief valve having an exhaust port 114. Spring 113 seats on a pin 115 extending across the valve bore. Valve 110 is provided as a safety feature to prevent excess pressures in the system as might occur in the event either the slide 51 of pump 50 or pressure regulator valve 55 should become stuck in an improper position. Ball 111 is normally seated by spring 113 but may open under excess pressure to release pressure through exhaust port 114. Valve 110 also prevents excess pressure when the oil is cold.

Governor

Main pressure supply line 400 extends to a hydraulic governor 120 shown in FIGURE 4 arranged to be driven at speeds proportional to vehicle speed, for example, by power delivery shaft 45. The governor 120 may be of the type disclosed in the application to Borman et al., Serial Number 477,832, filed December 27, 1954, entitled Controlled Coupling Automatic Transmissions. The governor 120 develops two stages of pressure determined by the speed at which the governor is rotated. A first stage, termed G–1 pressure, is delivered to a passage 432 and a second stage termed G–2 pressure is delivered to a passage 433. These two stages are developed simultaneously, the G–2 pressure being developed at a different rate than G–1 pressure. Both the G–1 and G–2 pressures vary with vehicle speed. Since the operation of the governor is fully described in the above referred to Borman application, further detailed description is deemed unnecessary herein. The G–1 pressure in passage 432 and G–2 pressure in passage 433 are used for control purposes as hereafter more fully explained.

2–3 Shift Valve

Main line pressure supply passage 400 extends to a 2–3 shift valve assembly indicated generally at 125 used to control shift of drive ratio between second and third gear. Assembly 125 includes a governor valve 126, shift valve 127 and a modulator valve 128 all movable in a valve bore of a valve body 129. Governor valve 126 includes three spaced lands 130, 131 and 132 and ports 133, 134, 135, 136, 137 and 138. A plug 139 in the end of the valve bore is connected to exhaust through an exhaust port 140. Port 133 connects to G–1 pressure supply passage 432 to admit G–1 governor pressure to the left end of land 130. Port 134 connects to main pressure supply passage 400. Port 135 connects to a third gear coupling feed passage 409. Port 136 connects to an intermediate range line pressure supply passage 402 controlled by manual valve 70. With the manual valve 70 positioned in drive range as illustrated, intermediate range passage 402 is connected to exhaust through ports 81 and 84 of the manual valve. Port 137 connects to an overrun band supply passage 441. Port 138 connects to a 2–1 signal passage 412.

Shift valve 127 includes three spaced lands 141, 142 and 143, adapted to cooperate with ports 144, 145, 146, 147, 148, 149 and 150. An enlarged head 151 of greater diameter than land 143 is secured to the end of land 143. A spring 152 is seated on the valve bore and upon head 151 is less in magnitude than spring 161 so valves 126 and 127 are biased toward the left or downshift position by the net effect of spring 161. Port 144 connects to 2–1 signal passage 412. Port 145 connects to a 2–3 passage 435. Port 146 connects to a front clutch supply passage 420. Port 147 connects to throttle valve pressure supply passage 426. Port 148 connects to a shift throttle valve passage 440. Port 149 connects to part throttle TV passage 438, and port 150 connects to G–2 governor passage 433.

Modulator plug 128 includes a pair of spaced lands 152a and 153 of different diameter and an extension 154 adapted to contact the head 151 of the shift valve. A plug 155 blocks off the end of the valve bore. Modulator plug 128 has four ports 156, 157, 158 and 159 associated therewith, the ports 157 and 159 being connected by means of a modulated throttle valve pressure delivery passage 160. A spring 161 seated on head 151 of shift valve 127 also seats on the end of land 152a to yieldably bias modulator plug 128 to the right. Port 156 connects to shift throttle valve pressure supply passage 440. This shift throttle valve pressure will act on the end of land 153 and bias plug 128, shift valve 127, and governor valve 126 to the left or downshift position. It will be noted that land 152a is of less diameter than land 153 and also of less diameter than the bore in which the land 152a is inserted. Port 158 is connected to a pressure supply passage 442 which may be supplied with line pressure either from passage 439 controlled by valve 95 or from passage 402 when manual valve 70 is positioned for intermediate range operation.

Pressure Boost Valve

Main line pressure supply passage 400 extends to a pressure boost valve indicated generally at 165 in FIGURE 5 and provided with four spaced lands 166, 167, 168 and 169. The bore of the valve body has seven ports 171, 172, 173, 174, 175, 176 and 177 therein associated with valve 165. A spring 178 seated upon a plug 179 seated on a pin 179a normally biases valve 165 to the left. Port 171 connects to a drive range pressure supply passage 401 controlled by manual valve 70 and admits line pressure to the end of land 166 when valve 70 is positioned for drive range operation. Port 172 connects to a line drop feed passage 405 controlled by manual valve 70. Line drop feed passage 405 will be supplied with line pressure through valve 70 when valve 70 is positioned for drive, reverse or low range operation. Port 173 connects to a line drop signal passage 406. Port 174 connects to main line pressure supply passage 400. Port 175 connects to a line boost pressure passage 425. Port 176 connects to a pressure boost passage 431. Port 177 connects a front clutch signal passage 420 to the end of land 169.

Coupling Timing Valve

In the same bore with pressure boost valve 165 is a coupling timing valve 180 having four spaced lands 181, 182, 183 and 184. The valve bore has seven ports 185, 186, 187, 188, 189, 190 and 191 therein and associated with valve 180. Port 185 connects to exhaust. Port 186 connects to a coupling feed passage 410. Port 187 connects to third gear coupling feed passage 409. Port 188 connects to line pressure supply passage 400. Port 189 connects to a signal passage 408. Port 190 connects to a passage 430, and port 191 connects to a second to third passage 435. A spring 192 seated upon a plug 193 yieldably biases coupling timing valve 180 to the left so that the end of land 181 contacts pin 177.

Coupling Feed Limit Valve

Main line pressure supply passage 400 finally extends to a coupling feed limit valve 195 shown in FIGURE 3, having spaced lands 196 and 197, and biased to its upper position by a strong spring 198. The valve base of valve 195 is provided with four ports 199, 200, 201 and 202. Port 199 admits signal pressure from signal pressure passage 408 to the end of land 196. Port 200 connects to main line pressure supply passage 400. Port 201 connects to a coupling feed passage 411, and port 202 connects to exhaust. In the event that fluid pressure in signal passage 408 is greater than a predetermined minimum pressure, coupling feed limit valve 195 will move downwardly against spring 198 to admit line pressure from main line pressure supply passage 400 to coupling feed passage 411. In the event that signal pressure in passage 408 is less than said predetermined amount, valve 195 will block off passage 400 from coupling feed passage 411.

1–2 Shift Valve

A first to second shift valve assembly indicated generally at 205 in FIGURE 5 includes governor valve 206, a shift valve 207 and a modulator valve 208. Governor valve 206 includes four spaced lands 209, 210, 211 and 212, the land 209 being of greater diameter than the remaining lands of the valve. A plug 213 blocks off one end of the valve bore. It will be noted that land 212 is spaced from the valve bore to permit fluid flow between the land and bore to an exhaust port 221 when the valve is upshifted. Seven ports 215, 216, 217, 218, 219, 220 and 221 are associated with governor valve 206. Port 215 connects to G–1 governor pressure delivery passage 432. Port 216 connects to low range pressure supply passage 403 controlled by manual valve 70. Port 217 connects to a branch 413 of a second to first gear signal passage 412. Port 218 connects to a front clutch pressure supply passage 420. Port 219 connects to a drive range pressure supply passage 401. Port 220 connects to a first gear passage 429, and port 221 connects to exhaust.

First to second shift valve 207 includes two spaced lands 222 and 223. A spring 224 seated on the valve bore and the end of land 223 yieldably biases shift valve 207 and governor valve 206 to the left or downshift position. Four ports 225, 226, 227 and 228 are associated with shift valve 207. Port 225 connects to 2–1 signal passage 412. Port 226 connects to throttle valve pressure delivery passage 426. Port 227 connects to a passage 229. Port 228 connects to a passage 439 controlled by valve 95.

Modulator valve 208 includes spaced lands 230 and 231 and an extension 232 adapted to about the end of land 223 of shift valve 207. A spring 233 is disposed between the end of land 223 and the end of land 231. Four ports 234, 235, 236 and 237 are associated with modulator valve 208. Ports 234 and 236 are connected to each other by a modulated throttle valve pressure delivery passage 238. Port 235 connects to exhaust. Port 237 connects to a passage 239. A ball check 240 is disposed at the junction of low range pressure supply passage 403, passage 229 and passage 239. With manual valve 70 positioned for low range operation, line pressure in low range pressure supply passage 403 will flow from passage 403 to passage 239. With valve 70 positioned for any other drive condition of operation passage 403 will be connected to exhaust. Throttle valve pressure will be able to pass through ports 226 and 227 of shift valve 207 to passage 229 and past ball valve 240 to passage 239 when valve 207 is downshifted. Ball valve 240 will then block off low range pressure supply passage 403 from passage 229 to prevent exhaust of throttle valve pressure through passage 403. Throttle valve pressure from passage 239 will force valve 208 to the left to admit pressure to the end of land 223 of shift valve 207 through port 236, passage 238 and port 234. Due to the action of spring 233 on modulator valve 208, the pressure delivered through passage 238 will be lower than that in passage 239. The pressure acting on the end of land 223 will also act on the end of land 231 tending to move valve 208 to the right to block off port 236 and open exhaust port 235. The pressure delivered to passage 238 will be less than, but proportional, to the pressure supplied to passage 239. The end of the valve bore adjacent to land 230 is blocked off by a plug 241.

*Section to First Cut Off Valve*

A second to first cut off valve 250 shown in FIGURE 5 includes a slidable member having three spaced lands 251, 252 and 253 and a stem 254 thereon. Six ports 255, 256, 257, 258, 259 and 260 are associated with the valve. A spring 261 normally biases valve 250 to the right. Port 255 connects to a throttle valve pressure delivery passage 426. Port 256 connects to second to third pressure passage 435 controlled by the second to third speed shift valve 127.

Port 257 connects to a second to third gear pressure transfer passage 436. Port 258 connects to exhaust. Port 259 connects to a branch 414 of second to first gear signal passage 412. Port 260 connects to exhaust. Due to the action of spring 261, valve 250 will normally be biased towards its right-hand position and will remain in this position whenever the throttle valve pressure from passage 426 is below a predetermineed value, for example 25 p.s.i. In the event the throttle valve pressure is greater than 25 p.s.i., valve 250 will move to the left-hand position where stem 254 abuts the end of the valve bore. The valve is used primarily in the event of "panic stops" to provide a rapid exhaust of the front clutch by connecting the second to first signal passage 412 to exhaust. Thus, when the second to third and first to second shift valves move to their downshifted position and the vehicle is brought to a rapid standstill, the fluid torque transfer unit and front unit clutch will not be engaged simultaneously. This prevents engine stalling as would otherwise occur. Second to first signal passage 412 is continuously connected to exhaust through a restricted opening 262 shown in branch passage 413 of passage 412.

*Second to Third Boost Valve*

A second to third speed pressure boost valve 265 shown in FIGURE 5 includes lands 266 and 267 and a stem 268. A spring 269 seated upon a plug 270 closing off the valve bore and seated upon land 266 yieldably biases valve 265 to its right-hand position. Five ports 271, 272, 273, 274 and 275 are provided in the valve bore. Port 271 connects to a second to first gear signal passage 415 which is an extension of second to first gear signal passage 412. Port 272 connects to a second to third gear pressure boost passage 437. Port 273 connects to a second to third gear pressure transfer passage 436. Port 274 connects to coupling feed passage 410. Port 275 connects to exhaust. Boost valve 265 is effective when throttle valve pressure acting on second to first gear cut-off valve 250 is less than 25 p.s.i. during a shift from second to third gear and admits line pressure from passage 436 to passage 437 to give a boost to the line pressure on a light throttle second to third gear shift. This provides fast fill of coupling 11. The line pressure boost provided by the valve 265 is effective only during the shift interval. Upon a rise of pressure in the fluid coupling, coupling pressure in passage 410 enters port 274 and acts on the end of land 266 to move the valve 265 to its right-hand position to block off passage 437 from passage 436.

*Front Clutch Exhaust Valve*

A front clutch exhaust valve 280 shown in FIGURE 4 includes a pair of spaced lands 281 and 282 and an extension 283. A spring 284 seated upon a pin 285 and upon land 282 yieldably biases valve 280 to its left-hand position. Four ports 286, 287, 288 and 289 are associated with the valve. Port 286 connects to coupling feed passage 410. Port 287 connects to second to first gear signal passage 412. Port 288 and 289 connect to exhaust. Valve 280 is used during a second to first gear downshift to exhaust the front clutch 28 after the coupling feed pressure is adequate for the coupling to carry the load.

*Neutral Brake Valve*

Positioned in the same bore with front clutch exhaust valve 280 is a neutral brake valve 290 having lands 291 and 292 of equal diameter and a land 293 of greater diameter. A spring 294 seated upon a plug 295 in the end of the valve bore yieldably biases the valve to its left-hand position. Four ports 296, 297, 298 and 299 are associated with the valve. Port 296 connects to a drive line pressure passage 401 which will be supplied with line pressure when the manual valve 70 is moved from neutral to drive range position. Port 297 connects to a passage 428 leading to the neutral brake piston 46. Port 298 admits pressure from neutral brake supply passage 428 to the valve bore between lands 292 and 293 through a restriction 300. Port 299 connects to a passage 427 which may be supplied with either throttle valve pressure or second to third gear pressure boost oil. The purpose of valve 290 is to provide initial fast fill of the neutral brake servo upon moving the manual valve from neutral to drive range and to thereafter cause limited rate of fill for pressure make up purposes. The pressure supplied to port 299 is used to calibrate the action of the valve in accordance with load as expressed by torque demand to provide smooth brake engagement.

*Pressure Drop Valve*

A pressure drop valve 305 shown in FIGURE 4 includes lands 306 and 307 of different diameter and an extension 308 adapted to contact a pin 309. A spring 310 yieldably biases valve 305 to its left-hand position. Four ports 311, 312, 313 and 314 are associated with the valve. Port 311 connects to passage 427 which may be supplied with either throttle valve pressure from valve 90 or second to third gear pressure boost oil in the event of a light throttle second to third speed shift. Port 312 connects to line drop signal passage 406. Port 313 connects to a line drop pressure delivery passage 407. Port 314 connects to exhaust. Throttle valve pressure acting on the end of land 306 will tend to move the valve 305 to the right against the action of spring 310 to cut off port 312 and to connect port 313 to exhaust port 314. It will be apparent that the pressure delivered to passage 407 will vary inversely with that suppleid by passage 427. As shown in FIGURE 3, line boost passage 407 is connected to the space between lands 56 and 57 of valve 55 through a port 315. Since land 57 is of greater diameter than land 56, this pressure will exert a downward force on the valve 55 in opposition to spring 61. An increase in pressure supplied to line drop passage 407 by pressure drop valve 305 will decrease the line pressure supplied to passage 400 by pressure regulator valve 55.

*Second to First Downshift Valve*

A second to first downshift valve 320 shown in FIGURE 4 includes lands 321 and 322 and a stem 323. A spring 324 yieldably biases valve 320 to its right-hand position. Four ports 325, 326, 327 and 328 are associated with valve 320. Port 325 admits pressure from second to first signal passage 412 to the end of land 321. Port 326 connects passage 412 to the space between lands 321 and 322. Ports 327 and 328 connect to exhaust. This valve is effective only during a second to first downshift and offers a means of exhausting the front clutch. The valve regulates at approximately 35 pounds per square inch and therefore prevents a rapid drop of front clutch pressure during this downshift. If the clutch exhaust pressure is greater than 35 pounds, an initial rapid exhaust of pressure from the front clutch is provided.

*Coupling Dump Valve*

The hydrodynamic torque transfer unit 11 is provided with a series of coupling dump valves 330, one of which is shown in FIGURE 3. Valve 330 includes a head 331 carried by a guide stem 332 and is yieldably biased by a spring 333 to connect the working chamber of the hydrodynamic device to exhaust through an exhaust port 334. Valve 330 will move downwardly against the action of spring 333 to block off exhaust port 334 in response to pressure supplied to the upper side of head 331 through a coupling signal passage 408.

Working fluid may be supplied to the unit either through coupling feed passage 410 or coupling feed passage 411 or both.

*Front Clutch Accumulator*

A front clutch accumulator 340 shown in FIGURE 4 is connected to the front clutch pressure supply passage 420 by way of a port 342 in accumulator housing 341. A guide pin 343 fixed to housing 341 slidably supports pistons 344 and 345 thereon. Springs 346 and 347 yieldably bias the pistons 344 and 345, respectively, into contact with each other. Pistons 344 and 345 are of different diameter and port 342 admits front clutch pressure to a chamber 348 between the pistons. A chamber 350 beneath piston 345 is adapted to receive a variable pressure from a compensator valve pressure delivery passage 349. It will be apparent that the accumulator pistons will move to compress the springs 346 and 347 in response to pressure in chamber 348. Piston 344 is responsive solely to the rate of spring 346. Piston 345 is responsive not only to the rate of spring 347 but also to the compensator pressure supplied to chamber 350. The accumulator 340, which is used to control the rate of engagement of the front clutch provides a two stage action for smooth clutch engagement and for calibrating the engagement of the clutch very closely to the torque output of the engine. As hereafter more fully explained, the pressure delivered to chamber 350 is caused to vary in close relationship to engine developed torque so as to calibrate the clutch engagement to the engine torque.

*Compensator Valve*

A compensator valve indicated generally at 355 includes a valve member 356 and a plunger 357. Valve 356 is provided with lands 358 and 359 of equal diameter and a land 360 of greater diameter than lands 358 and 359. Six ports 361, 362, 363, 364, 365 and 366 are associated with valve 356. A spring 367 seated upon land 360 yieldably biases valve 356 to its right-hand position. Plunger 357 includes lands 368 and 369, the land 369 being of greater diameter than land 368. A spring 370 seated upon land 369 yieldably biases plunger 357 towards its right-hand position. Two ports 371 and 372 are associated with plunger 357. A plug 373 blocks off the end of the valve bore.

Port 361 admits throttle valve pressure from passage 426 to the end of land 358. Port 362 connects to drive line pressure supply passage 401. Port 363 delivers compensator pressure to compensator pressure delivery passage 349. Ports 364 and 365 connect to exhaust. Port 366 admits compensator pressure to the space between land 360 and land 368. This pressure will tend to move valve 356 to the left and plunger 357 to the right. Port 371 admits compensator pressure to the space between land 369 and plug 373. This pressure will tend to move plunger 357 to the left against the action of spring 370, and pressure admitted through port 366. Port 372 connects to exhaust.

Figure 6:
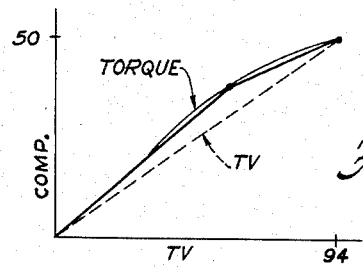
FIGURE 6 is a diagram illustrating the relation of engine developed torque, throttle valve pressure, and compensator pressure.

The compensator pressure in passage 349 is controlled by throttle valve pressure which increases with increase in torque demand, but which is not necessarily proportional to engine torque output. The pressure delivered by compensator valve 355 more closely approximates the actual engine torque curve than does throttle valve pressure, and is arrived at in two stages. In the initial stage of operation, valve 356 does the regulating and plunger 357 is of no effect. Initially, throttle valve pressure acting upon land 358 will move valve 357 to the right such that port 362 is connected to port 363. Pressure delivered to compensator passage 349 acting upon land 360 will move valve 356 to the left against the action of spring 367 and the throttle valve pressure acting on the end of land 358 to cause land 359 to block off port 362 from port 363 and connect port 363 to exhaust port 364. The compensator pressure maintained in passage 349 will increase with increase in throttle valve pressure and decrease with decrease in throttle valve pressure but at a different rate, the pressure curve of the compensator pressure being calibrated to follow the actual engine torque curve. In this initial stage of operation, compensator pressure admitted to port 371 of plunger 357 is not sufficient to overcome the action of compensator pressure acting on the end of land 368 plus the effect of spring 370. After the compensator pressure rises to a predetermined value, plunger 357 moves to the left so as to extend an additional force upon valve 356 tending to move valve 356 to the left. This is the second stage operation wherein valve 356 is moved to the left by plunger 357. A set of curves in FIGURE 6 illustrates the throttle valve pressure, two stage compensator pressure, and engine torque curve. It will be apparent that the compensator pressure more closely approximates the engine torque curve than does the throttle valve pressure.

In operation of the accumulator 340 when line pressure is admitted to front clutch apply passage 420, piston 344 will initially move against spring 346 to delay the pressure build-up in line 420 as the front clutch discs come into contact. The compensator pressure in chamber 350 varies closely with changes in engine torque. The pressure build-up in passage 420 and acting on the front clutch therefore is calibrated to vary closely with torque changes so as to provide smooth completion of the clutch engaging action, and with adequate capacity to handle the torque load. At light throttle and light torque, more time may be utilized to complete the clutch engagement than when heavy throttle and heavy torque conditions exist. It will be apparent that the accumulator, in combination with the particular compensator valve, varies the rate of pressure build-up in passage 420 to change the rate at which clutch engagement is completed in accordance with changes in engine torque or distinguished from mere changes in engine torque demand.

Overrun Band

Overrun band 43 of FIGURE 1 may be applied by a servo 375 shown in FIGURE 4 having a piston 376 disposed in a cylindrical chamber 377 and carried by a band actuating rod 378. A spring seat 379 is fixed to rod 378 for movement therewith. Piston 376 is slidable upon rod 378. A pair of springs 380 and 381 seated upon spring seat 379 bear against piston 376. An additional spring 382 seated upon the housing 383 of servo 375 and upon spring seat 379 yieldably biases the piston 376 and rod 378 to a released position when chamber 377 is connected to exhaust. This assures complete disengagement of band 43 without band drag when chamber 377 is connected to exhaust. Upon admission of fluid pressure to chamber 377, piston 376 will move rod 378 outwardly from servo 375 into initial contact with overrun band 43. As the band 43 contacts the ring gear 23, resistance to further movement causes piston 376 to move relative to rod 378 to compress the springs 380 and 381. This compression of springs 380 and 381 provides a controlled rate of force application to band 43 for smooth band engagement.

Fluid pressure is supplied to chamber 377 through a passage 441 to apply the overrun band when the manual valve 70 is placed for intermediate range operation and the transmission is in either first or second gear. The overrun band is also applied with the manual valve 70 placed for low range operation.

Reverse Blocker

A reverse blocker 385 shown in FIGURE 4 is supplied with G-1 governor pressure from governor pressure delivery passage 432. Blocker 385 comprises a piston 386 slidable in a housing 387 and is formed with an open slot 388 in one end of piston 386. Slot 388 cooperates with a cross pin 389 to limit the extent of movement of piston 386 to the left. A spring 390 abuts cross pin 389 and yieldably biases piston 386 into housing 387 to its disengaged position. Piston 386 when moved to the left by G-1 pressure at some minimum vehicle speed, for example 7 or 8 miles per hour, engages with linkage, not shown, connected to the manual valve 70 to prevent the operator from moving the manual valve into its Reverse position. This prevents the operator from accidentally placing the manual valve in reverse at high vehicle speed.

Operational Summary

The operation of the hydraulic control system in conjunction with the transmission to obtain the various drive conditions will be apparent from the following explanation.

Park and Neutral

It is contemplated that the manual valve 70 must be moved to either the Park or Neutral position before the engine starting circuit is completed and the engine may be started. With the manual valve 70 in the Park position, linkage connected to the manual valve will cause a pawl or dog, not shown, to engage locking teeth associated with the load shaft 45 to positively prevent rotation thereof and thereby prevent movement of the vehicle. With the engine started, pump 50 will supply pressure to main supply line 400. The pressure in passage 400 will be determined by the action of pressure regulator valve 55 and may vary between 132 and 180 p.s.i. as hereafter explained.

With the manual valve in either the park or neutral position, drive passage 401, intermediate range passage 402 and low range passage 403 are all connected to exhaust through the right-hand end of valve 70. Reverse pressure supply passage 404 is connected to exhaust by way of exhaust port 85. Pressure from supply passage 400 is admitted to line drop feed passage 405 by way of ports 78 and 80. Passage 405 extends to port 172 of pressure boost valve 165. Since drive range passage 401 is connected to exhaust, spring 178 biases line pressure boost valve 165 to the left to connect line drop feed passage 405 to a line drop signal passage 406 by way of ports 172 and 173 of valve 165. Passage 406 supplies oil to port 312 of pressure drop valve 305. Line passage 400 supplies oil to port 103 of throttle valve 90 and this valve delivers variable pressure as heretofore explained to throttle valve pressure delivery passage 426. Throttle valve pressure from passage 426 is admitted to passage 427 through a ball check valve 244. Valve 244 is positioned to block off a passage 437 by throttle valve pressure acting on the valve. Throttle valve pressure from passage 427 is admitted to the end of land 306 of pressure drop valve 350 to control the action of the valve. At closed or no throttle, no throttle valve pressure will exist in passage 427, and spring 310 will position the pressure drop valve to connect line drop signal passage 406 to line drop passage 407. This pressure, acting on land 57, will move pressure regulator valve 55 to its minimum pressure position against the action of spring 61. The minimum pressure maintained in main pressure supply line will be 132 p.s.i. As the accelerator pedal is depressed, the throttle valve pressure delivered to passage 427 and to port 311 of pressure drop valve 305 will increase, moving valve 305 to the right against the action of spring 310. Valve 305 thereupon regulates the pressure delivered to passage 407 so that the pressure in passage 407 diminishes with increased throttle valve pressure in passage 427. At full throttle, valve 305 will block off port 312 and connect passage 407 to exhaust, to permit full action of spring 61. This will provide line pressure in passage 400 to rise to 180 p.s.i. The action of pressure drop valve 305 is progressive so that pressure delivered by pressure regulator valve 55 may vary with throttle opening between a minimum of 132 and a maximum of 180 p.s.i. This action cuts down pump noise at closed throttle and at the same time permits the charge pressure to the hydraulic coupling to increase as the throttle is opened.

In park and neutral, the coupling 11 is charged with pressure in the following manner. Line pressure is supplied by main line pressure supply passage 400 to port 188 of coupling timing valve 180. Spring 192 positions valve 180 to connect port 188 to port 189, thereby admitting line pressure from passage 400 to signal passage 408 leading to coupling exhaust valve 330, the pressure acting on valve 330 being effective to move the valve against spring 333 to block off exhaust port 334. Passage 408 also extends to the end of coupling feed limit valve 195, and acts on the end of land 196, tending to move the valve against spring 198. At any throttle opening, the line pressure acting on land 196 will be sufficient to move the valve and land 197 will uncover port 201 connecting it to port 200. It will be noted that line pressure supply passage 400 is continuously hydraulically connected to a third gear coupling feed passage 409 through a restriction 245. Pressure supplied to passage 409 is admitted to coupling feed passage 410 through ports 187 and 186 of coupling timing valve 180. Thus the coupling is filled with fluid when the manual valve is positioned for either park or neutral condition of operation.

It will be noted that coupling feed passage 410 extends to port 286 of front clutch exhaust valve 280. As the coupling feed pressure builds up, this pressure becomes effective to move valve 280 to the right against action of spring 284 to connect second to first gear signal passage 412 to exhaust through port 287 and exhaust port 288. A branch 413 of second to first gear signal passage 412 extends to port 217 of first to second control valve 206. Valve 206 in its downshifted position connects passage 413 to a front clutch pressure supply passage 420 by way of ports 217 and 218. The front unit clutch will therefore be connected to exhaust and released.

*Drive Range—Low Gear*

Manual valve 70 may be moved from neutral to drive range to make possible drive of the vehicle. Coupling 11 will remain charged with fluid in the manner heretofore described. Upon movement of valve 70 to drive range operation, line pressure from main line supply passage 400 is admitted to a drive passage 401, through ports 78 and 79 of valve 70. Drive oil from passage 401 enters port 171 of pressure boost valve 165 and acting upon land 166 of the valve, moves the valve to the right against action of spring 178. Port 174 of valve 165 is connected to port 173 to admit line pressure from main pressure supply passage 400 to line drop signal passage 406 connected to port 312 of pressure drop valve 305. Line pressure from main line supply passage 400 is also permitted to enter a line boost supply passage 425 by way of ports 174 and 175 of pressure boost valve 165. This line boost pressure in passage 425 enters port 316 of the pressure regulator valve and acts on piston 317 to strengthen the action of spring 61. This line boost feature in and of itself in the absence of the line drop feature provided by line drop valve 305 is effective to raise the pressure supplied to main line pressure supply passage 400 from 105 to 180 p.s.i. However, the pressure prevailing in passage 400 will be modified by the action of pressure drop valve 305. In first gear operation, the line pressure may vary between 132 p.s.i. and 180 p.s.i., depending upon throttle opening. As heretofore explained, throttle valve 90 delivers a variable pressure which increases with throttle opening as the engine accelerator pedal is depressed. Throttle valve pressure delivery passage 426 is connected to passage 427 through a ball check valve 244, the pressure in passage 427 entering port 311 of pressure drop valve 305. At closed throttle, or with the accelerator pedal relaxed, pressure in passage 427 will be zero. Spring 310 will position valve 305 to connect passage 406 to passage 407 by way of ports 312 and 313. Passage 407 is connected to port 315 of pressure regulator valve 55. Pressure acting on land 57 will cause valve 55 to move downwardly against the action of spring 61 to reduce the effectiveness of the spring. At closed throttle, the pressure delivered to passage 407 through ports 312 and 313 of pressure drop valve 305 will be maximum. The line pressure maintained in passage 400 by pressure regulator valve 55 will be minimum of 132 p.s.i., when full line pressure is admitted to line pressure drop passage 407 and to line pressure boost passage 425. As the accelerator pedal is depressed to increase throttle valve pressure in passage 427, pressure drop valve 305 will move against spring 310 to reduce the pressure in passage 407. This drop in pressure in passage 407 will permit the pressure regulator valve to raise the line pressure supplied to passage 400. Thus, line pressure in first gear will vary between 132 and 180 p.s.i., depending upon the pressure delivered by throttle valve 90, the line pressure in passage 400 being increased as the throttle is opened.

The line pressure boost provided in passage 400 in first gear drive over that prevailing in neutral condition of operation is to provide a high coupling charge pressure to coupling feed passage 411 and to provide adequate holding capacity for the neutral brake 42 when the brake is engaged. It will be understood that the rise in line pressure 400 will cause the signal pressure in passage 408 to increase sufficiently to move coupling feed limit valve 195 to connect line passage 400 to coupling feed line 411 through ports 200 and 201 of valve 195 for fast coupling feed.

With coupling 11 filled with fluid it is necessary to engage neutral brake 42 to establish first gear operation. Pressure supplied to drive passage 401 is delivered to port 362 of compensator valve 355 to supply the valve with oil and to port 296 of neutral brake valve 290. A neutral brake pressure supply passage 428 is continuously connected hydraulically to drive range pressure supply passage 401 by means of a restriction 301, and is connected to ports 297 and 298 of neutral brake valve 290. Initially spring 294 will position valve 290 to connect passage 401 to passage 428 to by-pass restriction 301 by way of ports 296 and 297. This assures initial fast feed to passage 428. As the neutral brake engages, pressure in passage 428 will rise due to the resistance to movement of the neutral brake piston. This pressure admitted to the valve bore through restriction 300 and port 298 and acting on land 293 will cause valve 290 to move to the right to block off port 296 from port 297. Thereafter all supply of fluid to passage 428 will be through restriction 301. This will provide a smooth engagement of neutral brake 42 when the manual valve is shifted from neutral to drive range operation. It will be noted that throttle valve pressure from passage 427 is admitted to the end of land 293 of valve 290 through port 299. This pressure, acting in assistance to spring 294, will delay the time at which valve 290 moves to block off the by-pass through ports 296 and 297. The delay is increased with throttle opening to assure that sufficient pressure exists in passage 428 to complete the engagement of the neutral brake irrespective of the load that the brake is required to carry. The combination of initial fast feed to the neutral clutch through the by-pass around restriction 301 provided by valve 290 and subsequent feed through restriction 301 during actual brake engagement reduces the harshness of engagement of the brake. At heavy throttle, valve 290 may remain in its left-hand position due to action of throttle valve pressure acting on land 293 so that the by-pass provided through ports 296 and 297 remains effective. This assures adequate pressure in passage 428 to prevent burn up of the brake due to slippage at heavy throttle.

With the coupling 11 filled with working fluid and neutral brake 42 engaged as above explained, the transmission will be conditioned for first gear forward drive.

It will be noted that drive oil from passage 401 is admitted to a first gear passage 429 by way of ports 219 and 220 of the first to second governor valve 206 when the valve is in its downshift position. This oil will flow past ball check valve 242 to a passage 430 to port 190 of coupling timing valve 180. Normally port 190 will be blocked off by land 184 in first gear drive and this pressure will have no effect. However, in the event that coupling timing valve should accidentally become stuck in its right-hand position with spring 192 compressed, line pressure will be admitted from passage 430 through ports 190 and 189 to signal passage 408 to keep the coupling dump valve 330 closed.

It will further be noted that oil pressure from passage 430 will flow past a second ball check valve 243 to a pressure boost passage 431 which extends to port 176 of pressure boost valve 165. Normally, land 168 of valve 165 would block off passage 431. However, in the event that valve 165 should accidentally become stuck in its left-hand position, pressure would be admitted from passage 431 to line boost passage 425 through ports 176 and 175 of valve 165 to boost the line pressure supplied by pressure regulator valve 55. A fast coupling fill will be provided through ports 200–201 of valve 195 by way of passage 411.

The above two features are normally not used, but constitute safety features to assure that the coupling will not be unintentionally exhausted if the coupling valve 180 should be stuck in the wrong position and to provide pressure boost in the event that the pressure boost valve 165 should become stuck in the wrong position. This safety function will permit operation in first gear which would otherwise be impossible in the event of faulty functioning of the valves 180 and 165.

Drive Range—Second Gear

Upon a shift from first gear to second gear drive, neutral brake 42 remains engaged, coupling 11 is emptied of working fluid, and front clutch 28 is engaged. Also, the pressure supplied by pressure regulator valve 55 to supply passage 400 is changed from a range of from 132 to 180 p.s.i. as in low gear to a range from 74 to 105 p.s.i. in second gear.

As the vehicle speed increases in first gear drive, governor 120 delivers a pressure which increases with increase in vehicle speed to G–1 governor passage 432, this pressure being admitted to the valve bore of valve 206 adjacent land 209 through port 215. This pressure acting upon land 209 tends to upshift valve 206. At the same time, throttle valve pressure from passage 426 is admitted through ports 226 and 227 to passage 229, past ball check valve 240 to passage 239 and through port 237 to the end of land 230 of modulator valve 208. This will cause valve 208 to move to the left compressing spring 233 to exert a force on valve 207 and valve 206 tending to maintain the valves in their downshifted position. Initially, the spring chamber containing springs 224 and 233 is connected to exhaust through port 234, passage 238 and exhaust port 235. As modulator valve 208 moves to the left in response to throttle valve pressure acting on land 230, a modulated throttle valve pressure will be admitted to passage 238 and the spring chamber. This pressure will be proportional to but less than throttle valve pressure in passage 239. At some vehicle speed, depending upon throttle position, and consequent throttle valve pressure, G–1 governor pressure will become effective to upshift valves 206 and 207. Such action connects drive pressure supply passage 401 to front clutch pressure supply passage 420 by way of ports 219 and 218 of valve 206. Front clutch pressure supply passage 420 will be blocked off at port 146 of second to third speed shift valve 127 by land 142 of that valve. Pressure in passage 420 must pass through a restriction 417 in passage 420 and must charge front clutch accumulator 340 in order to engage the front unit clutch 28. The action of accumulator 340 controlled by compensator valve 355 has heretofore been explained in detail and need not here be repeated except to state that the orifice 417 and accumulator 340 cooperate to provide a controlled rate of clutch pressure build up to assure smooth clutch engagement.

It will be noted that front clutch pressure supply passage 420 is branched to connect to port 177 of coupling timing valve 180. Clutch pressure acting on the end of land 181 moves coupling timing valve 180 to the right against action of spring 192 to connect coupling feed passage 410 to exhaust by way of ports 186 and 185. Valve 180 also in its upshift position connects signal passage 408 to passage 430 by way of ports 189 and 190. This oil may flow past ball check valve 242 to passage 429 and be connected to exhaust through ports 220 and 221 of valve 206. Coupling dump valve 330 may thereupon open to connect the coupling to exhauust port 334.

Front clutch signal oil admitted from passage 420 to the valve bore through port 177 acts on the end of land 169 of pressure boost valve 165, moving the valve to the left against the action of pressure acting on the end of land 166. However, this front clutch signal pressure from passage 420 will not be high enough to move pressure boost valve 165 to the left until the front clutch is capable of carrying the torque. When pressure boost valve 165 is moved to the left, port 174 is blocked off by lands 167 and 168. Line pressure boost passage 425 is connected to passage 431 by way of ports 175 and 176. Fluid in passage 431 flows past ball check valve 243 to passage 430, past ball check valve 242 to passage 429 and is connected to exhaust by way of ports 220 and 221 of valve 206 which is now upshifted. With line pressure boost passage 425 connected to exhaust as just explained, pressure regulator valve 55 is effective to maintain a line pressure in passage 400 which varies between 74 and 105 p.s.i., depending on throttle setting. The pressure drop valve 305, controlled by throttle valve pressure as heretofore explained, will cause this variation of pressure in passage 400 as heretofore explained. With front clutch 28 engaged and coupling 11 empty, the transmission is conditioned for second gear drive. The drop in line pressure in second gear over that maintained in low or first gear drive results in horsepower savings in driving the pump, provides better fuel economy and reduces pump wear and noise.

Drive Range—Third Gear

In third gear drive front clutch 28 remains engaged and coupling 11 is again filled with fluid. The pressure schedule maintained by pressure regulator valve 55 is the same as for second gear drive. As the vehicle accelerates in second gear, G–1 governor pressure admitted from passage 432 to the end of land 130 through port 133 of valve 126, plug G–2 governor pressure admitted from passage 433 to land 151 of valve 127 through port 150 of valve 127, at some vehicle speed depending upon throttle valve pressure, will upshift the second to third speed shift valve assembly to establish third gear or direct drive. When valve 127 moves to the right to its upshifted position, front clutch passage 420, which is charged with oil, is connected to a second to third speed passage 435 by way of ports 146 and 145 of valve 127. Passage 435 connects to port 191 of coupling timing valve 180, and this pressure acting on the end of land 184 moves the coupling timing valve to the left against the action of front clutch signal pressure acting on the end of land 181. Movement of valve 180 to the left connects line pressure supply passage 400 to coupling signal passage 408 by way of ports 188 and 189 of coupling timing valve 180. Signal pressure in passage 408 closes exhaust valve 330 of coupling 11. At light throttle, the signal oil supplied to coupling feed limit valve 195 through passage 408 is not sufficient to move valve 195 against spring 198. Land 197 of valve 195 will block off port 200 from port 201 so that passage 411 is blocked off by valve 195. Supply of oil to coupling 11 is from passage 400, ports 134 and 135 of the second to third speed shift valve assembly, to third gear coupling feed passage 409. Passage 409 is connected to coupling feed passage 410 by way of ports 187 and 186 of coupling timing valve 180.

At heavy throttle, signal pressure in passage 408 is sufficient to move coupling feed limit valve 195 to connect line pressure supply passage 400 to coupling feed passage 11 through ports 200 and 201 of valve 195. At medium throttle opening and throttle valve pressure between 25 and 75 p.s.i., all coupling feed is from the second to third speed shift valve assembly. Thus, the rate of fill of coupling 11 is more rapid under heavy throttle conditions than under medium throttle operation.

In making a light throttle second to third speed shift under conditions where throttle valve pressure in passage 426 is less than 25 pounds, the main line pressure is initially momentarily boosted to provide high coupling feed pressure for rapid fill of coupling 11. Passage 435 which is charged with oil when valve 127 upshifts as explained above, extends to port 256 of second to first gear cut off valve 250. When throttle valve pressure from passage 426 acting on the end of land 251 is less than 25 pounds, spring 261 will be effective to position valve 250 to the right to admit line pressure from passage 435 to a transfer passage 436 by way of ports 256 and 257. Passage 436 admits pressure to the end of land 267 of second to third gear pressure boost valve 265 through port 273. This pressure will move valve 265 to the left against the action of spring 269 to admit oil under pressure to a second to a third speed pressure boost passage 437 by way of ports 273 and 272 of valve 265. Oil in passage 437 flows past ball check valve 244 to pressure boost passage 427. Valve 244 blocks off throttle valve pressure delivery passage 426 so that the pressure supplied to passage 427 on a second to third gear shift is line pressure rather than throttle valve pressure. On a second to third gear shift line pressure from passage 427 acting on the end of land 306 of pressure drop valve 305 moves the valve to the right against the action of spring 310 to block off line drop signal passage 406 and to connect line drop passage 407 to exhaust by way of ports 313 and 314 of valve 305. As heretofore explained in connection with the discussion of the second to third boost valve, the pressure boost provided by the valve is only effective during the interval of shifting from second to third gear and is not effective upon completion of change to third gear drive.

It will be noted that pressure from second to third gear boost passage 437 also flows past ball check valve 243 to pressure boost passage 431. Pressure from passage 431 is admitted to line pressure boost passage 425 through ports 176 and 175 of pressure boost valve 165. With line drop passage 407 connected to exhaust and line boost passage 425 supplied with line pressure, pressure regulator valve 55 raises the line pressure supplied to main line pressure supply passage 400 to 180 p.s.i. This high line pressure which is supplied to the end of land 196 of coupling feed limit valve 195 from signal passage 408 moves valve 195 downwardly against spring 198 to connect passage 400 to coupling feed passage 411 through ports 200 and 201 for fast fill of coupling 11.

It will be noted that a restriction 185a is placed in exhaust port 185 of coupling timing valve 180. This is provided as a safety feature useful in the event that timing valve 180 should accidentally become stuck in its right-hand position. The restriction 185a makes it possible for the pump 50 to maintain normal line pressure even though the exhaust port 185 is open. This permits the coupling to become charged with fluid so that the transmission will remain operative.

Drive Range—Third to Second Forced Downshift

In the event that the vehicle is being operated in third gear, a forced downshift at full throttle from third to second gear may normally be had for rapid vehicle acceleration. To obtain such a shift of drive ratio, cam 100 is effective at full throttle opening to position land 96 of valve 95 to connect a passage 439 which may be termed a detent passage to throttle valve pressure delivery passage 426 by way of ports 107 and 109 of throttle valve 95. At this time the pressure delivered to passage 426 by valve 95 will be full line pressure. Pressure in detent passage 439 is conducted past a ball check valve 245 to a passage 442 to port 158 of modulator valve 128. This line pressure acting on land 153 of modulator valve 128, moves valve 128 to the right to connect port 158 to port 157 and admit line pressure to passage 160. Pressure from passage 160 is admitted through port 159 to the right end of land 151 of valve 127, moving valve 127 to the left against the action of governor pressure tending to upshift the valve. With valve 127 in its downshift position, second to third gear passage 435 is connected to passage 412 by way of ports 145 and 144 of valve 127. Passage 412 is connected to exhaust by way of ports 225 and 221 of first to second governor valve 206. With passage 435 connected to exhaust, front clutch signal pressure from passage 420 acting on the end of land 181 of coupling timing valve 180 is effective to move valve 180 to the right against action of spring 192. This connects coupling signal passage 408 to passage 430 through ports 189 and 190 of valve 180. Fluid in passage 430 flows past ball check valve 242 to passage 429 and is connected to exhaust through ports 220 and 221 of valve 206. Dump valve 330 of coupling 11 is therefore effective to connect coupling 11 to exhaust port 334. With front clutch 28 still engaged and coupling 11 exhausted, a downshift from third to second is accomplished.

Part Throttle 3–2 Downshift

At lower vehicle speeds wherein the governor pressures supplied to the second to third gear shift valve assembly are of lower magnitude, a part throttle downshift from third to second gear may be accomplished by depressing the accelerator pedal to move cam 100 to a position wherein throttle valve pressure delivery passage 426 is connected to a part throttle pressure delivery passage 438 through ports 107 and 108. In this condition of operation passage 439 will be blocked off by land 96 and the pressure supplied to passage 438 will be throttle valve pressure rather than full line pressure. With 2–3 shift valve 127 in its upshift position, passage 438 will be connected to a passage 440 by way of ports 149 and 148 of valve 127. This pressure is admitted to the end of land 153 through port 156 and, depending upon governor pressures acting to maintain the valve in its upshift position, may force the second to third gear valve assembly to the left to its downshift position. Exhaust of the coupling is in the same manner as described in connection with the forced third to second downshift.

Closed Throttle 3–2 Downshift

A normal closed throttle downshift from third to second gear will occur at still lower vehicle speeds than the part throttle downshift. Land 96 of detent valve 95 will block off delivery of pressure to both passages 438 and 439. Throttle valve 90 will deliver no pressure to throttle valve pressure delivery passage 426. With shift valve 127 upshifted, land 142 blocks off port 147 so that no throttle valve pressure from passage 426 may be delivered to passage 440 even though some TV pressure is supplied to passage 426 in the event of slight throttle opening. With this condition, spring 161 will not be able to downshift the 2–3 valve assembly until G–1 and G–2 governor pressures in passages 432 and 433 are relatively low. The normal closed throttle downshift will therefore occur at a much lower vehicle speed than the part throttle downshift described above. Exhaust of coupling 11 on a closed throttle downshift is in the same manner as that described in connection with the full throttle downshift from third to second drive ratio.

Drive Range 2–1 Forced Downshift

Assuming the vehicle is operating in second gear drive ratio, a forced downshift from second to first gear may be had by depressing the accelerator pedal to cause cam 100 to position valve 95 to admit pressure from passage 426 to passage 439. At this condition of operation throttle valve 90 will deliver full line pressure to passages 426 and 439. Line pressure from passage 439 will pass through ports 228 and 227 of valve 207 to passage 229, past ball check valve 240 to passage 239, through port 237 to the end of land 230 of modulator valve 208. This line pressure will move the shift valve assembly to the left against the action of G–1 governor pressure to position the valve assembly in its downshift or first gear position.

Valve 206 blocks off drive range pressure supply passage 401 from front clutch pressure passage 420 and connects passage 401 to first gear passage 429 by way of ports 219 and 220. Fluid in passage 429 passes past ball check valve 242 to passage 430 and is admitted to signal passage 408 through ports 190 and 189 of coupling timing valve 180. This pressure in passage 408 closes exhaust valve 330 of coupling 11 so that the coupling may be filled with fluid. Pressure in passage 430 also flows past ball check valve 243 to passage 431 and is supplied to port 176 of pressure boost valve 165. Valve 175 connects passage 431 to line boost passage 425 through ports 176 and 175. This boosts the line pressure to 180 p.s.i. and coupling feed limit valve 195 is moved in response to this increased pressure in signal passage 408 to connect line pressure supply passage 400 to coupling feed passage 411 through ports 200 and 201 of valve 195. This provides a fast fill of coupling 11.

Front clutch pressure supply passage 420 is connected to second to first signal passage 413 through ports 218 and 217 of valve 206. Passage 413 is branched at 412 and extends to port 144 of second to third gear shift valve assembly 125. Passage 412 is connected to passage 435 through ports 144 and 145 of the second to third gear shift valve assembly. Passage 435 extends to port 191 of coupling timing valve 180, the pressure admitted to valve 180 acting on land 184 to move valve 180 to the left. Coupling timing valve 180 then connects main pressure supply line 400 to signal passage 408, the pressure in passage 408 being effective to close exhaust valve 330 of coupling 11. Passage 412 also extends to port 325 of second to first gear downshift valve 320, the pressure acting on the end of land 321 to move valve 320 to the left against action of spring 324. Valve 320 will assume a position wherein passage 412 may be alternately connected to exhaust port 327 through port 326 or may be blocked off from exhaust port 327 by land 322. 2–1 downshift valve 320 thereby reduces the pressure in second to first signal passage 412 to 35 p.s.i.

As the pressure in coupling 11 builds up, this pressure acting through coupling feed passage 410 is admitted to port 286 of front clutch exhaust valve 280 and acts on land 281 to move valve 280 to the right to connect passage 412 to exhaust through ports 287 and 288 of valve 280. The valve 280 constitutes a second to first timing valve and times the shift from second to first gear drive on heavy throttle. It is responsive to coupling feed pressure which is effective at heavy throttle, to cause the valve 280 to connect the front clutch to exhaust. Heavy throttle exhaust of the front clutch is by way of passage 420, ports 218 and 217 of valve 206, passage 413, passage 412 and ports 287—288 of front clutch exhaust valve 280.

Drive Range—Light Throttle Downshift

On a light throttle downshift, throttle valve pressure supplied to throttle valve pressure delivery passage 426 and delivered to port 255 of second to first cut off valve 250 will be less than 25 pounds. Spring 261 will be effective to position valve 250 to connect passage 414 and passage 412 to exhaust through ports 259 and 258. Exhaust of the front clutch on light throttle opening then is by way of passage 420, ports 218 and 217 of valve 206, passage 413, passage 414 and ports 259 and 258 of second to first cut off valve 250. It will be noted that an orifice 262 continuously connects passage 413 to exhaust so that part of the clutch pressure will be exhausted through orifice restriction 262. The valve 250 is provided in addition to orifice 262 to assure a rapid exhaust of front clutch pressure in the event of a very rapid or "panic" vehicle stop. Valve 250 provides the additional exhaust of the front clutch when the shift valves move to their downshift position to prevent simultaneous effectiveness of the coupling and front clutch when the vehicle is at a standstill. This prevents engine stalling as might otherwise occur particularly in a panic stop.

Intermediate Range

Manual valve 70 may be moved for intermediate range operation, in which event line drop feed passage 405 is blocked off by land 72 of valve 70 and intermediate drive range passage 402 is supplied with oil from main pressure supply passage 400 through ports 78 and 81 of valve 70. In first gear operation in intermediate range the line pressure may vary between 132 and 180 p.s.i. and is controlled in the same manner that the line pressure is controlled in first gear drive range operation heretofore explained. However, in second and third gear intermediate range operation the line pressure is maintained at 105 p.s.i. and is not permitted to vary between 74 and 105 p.s.i. as is the case in second and third gear drive range operation. Since no pressure is supplied to line drop feed passage 405, pressure boost valve 165 is unable to deliver pressure to line drop signal passage 406 and pressure drop valve 305 is unable to deliver pressure to line drop passage 407 irrespective of the amount of throttle valve pressure from passage 427 acting on pressure drop valve 305. Spring 61 of pressure regulator valve 55 will therefore cause line pressure supplied to main line 400 to be a constant 105 p.s.i. in second and third gear drive.

An intermediate range operation first and second gear drive, the drive ratio is attained in the same manner as that described in connection with first and second gear drive range operation. However, in intermediate range drive, overrun band 43 is engaged. Pressure from intermediate range pressure supply passage 402 is admitted through ports 136 and 137 of valve 126 to an overrun band servo supply passage 441 to engage overrun band servo supply passage 441 to engage overrun band 43.

It will be noted that intermediate range oil in passage 402 also flows past ball check valve 245 to passage 442 and is admitted through ports 158 and 157 of modulator valve 128 to passage 160 and through port 159 to the end of land 151 of valve 127 to hold the second to third gear shift valve assembly in its downshift position.

Shift to third gear may be had in intermediate range operation in the same manner as a shift to third gear in drive range operation except that the shift to third gear will occur at a higher vehicle speed because of the effect of line pressure supplied to the end of land 151 of valve 127. This will require a high vehicle speed to be attained before the governor pressure acting to upshift the second to third gear shift valve assembly can successfully accomplish this result. When the second to third shift valve does upshift, overrun band passage 441 is connected to second to first signal passage 412 through ports 137 and 138 of valve 126. Passage 412 is connected to exhaust through ports 225 and 221 of upshifted first to second shift valve governor plug 206. The overrun band is exhausted and released in third gear intermediate range operation. The overrun band will automatically be reapplied when the second to third speed shift valve assembly again downshifts to its second speed position.

Low Range

In low range operation line pressure will vary between 132 and 180 p.s.i. in the same manner as first gear, drive range operation. With manual valve 70 positioned for low range operation, line pressure is admitted from supply passage 400 to a low range passage 403 through ports 78 and 83 of valve 70. Passage 403 extends to port 216 of valve 206 and acts on land 210 to hold valve 206 in its downshift position. Pressure from passage 403 flows past ball check valve 240 to passage 239, through port 237 to the end of land 230 of modulator valve 208. This will cause stem 232 of valve 208 to contact land 223 of valve 207 and move valve 207 and valve 206 to their downshift position. Land 230 of modulator valve 208 will also uncover port 236 to admit line pressure through passage 238 and port 234 to the end of land 223 of valve 207 tending to hold the first to second shift valve assembly in its downshift position. Low range pressure supplied to passage 403 will in the above manner prevent any shift out of first gear in low range.

Reverse

With manual valve 70 positioned for reverse operation, drive passage 401, intermediate passage 402 and low range passage 403 are all connected to exhaust through port 84 of valve 70. Line pressure from supply line 400 is admitted to line drop feed passage 405 through port 80 and to reverse servo supply passage 404 through port 82 of valve 70. Passage 404 admits oil to reverse servo piston 34 to engage the brake. Pressure from passage 404 also flows past ball check valve 242 to passage 430 and to port 190 of coupling timing valve 180. Normally the pressure supplied to port 190 has no effect in reverse and is blocked off by land 184 of coupling timing valve 180. In the event that timing valve 180 should accidentally become stuck in its right-hand position, reverse oil at port 190 would be admitted to coupling signal passage 408 through ports 190 and 189 of valve 180 to close the coupling dump valve 330. This provides a safety feature which assures that the transmission can be operable in reverse in the event of improper functioning of valve 180. Normally, line pressure from passage 400 is admitted to signal passage 408 through ports 188 and 189 of valve 180. Reverse oil from passage 430 flows past ball check valve 243 to passage 431 to port 176 of pressure boost valve 165 and through port 175 to line boost passage 425. With pressure from passage 425 acting on piston 317 of pressure regulator valve 55, the valve boosts line pressure to the range of 132 to 180 p.s.i. in the same manner as in first gear drive range operation. Coupling feed limit valve is moved downwardly by the consequent high signal pressure in passage 408 to connect line pressure supply passage 400 to coupling feed passage 411 through ports 200 and 201 of valve 195. With the reverse brake 33 engaged and coupling 11 filled with fluid the transmission is conditioned for reverse operation.

It is claimed that:

1. In an engine driven transmisison, the combination of plural drive trains for establishing different drive ratios through the transmission, each train including a fluid pressure operated drive establishing device for rendering the respective drive train effective, a fluid pressure source, control valving for controlling the drive ratio including a manually operable drive range selector valve movable to select neutral, reverse, or any one of a plurality of forward drive range conditions of operation, a line pressure regulator valve normally effective to maintain a predetermined line pressure supply to said control valving, fluid pressure responsive means associated with said pressure regulator valve effective in response to fluid pressure for reducing the pressure supplied by said pressure regulator valve below said normal predetermined line pressure, a pressure drop valve, passage means controlled by said drive range selector valve and effective to deliver line pressure to said pressure drop valve when said drive range selector valve is positioned to select said neutral, reverse or said forward drive range condition of operation, passage means connecting said pressure drop valve to said fluid pressure responsive means, an additional manually operable valve supplied with line pressure from said source, a control chamber in said pressure drop valve, passage means directly connecting said control chamber to pressure discharged by said additional manually operable valve, said additonal manually operable valve is positioned to select said forward, reverse or neutral drive range condition of operation to deliver variable pressure to said control chamber through said last-mentioned passage means, the pressure delivered by said last-mentioned manually operable valve being varied from a minimum pressure when the torque demand is minimum to full line pressure when the torque demand is maximum such that said pressure drop valve is controlled solely as a function of torque demand when said drive range selector valve is positioned to select said forward drive range condition of operation, the pressure delivered by said pressure drop valve to said fluid pressure responsive means varying inversely with the control pressure delivered to said pressure drop valve by said additional manually operable valve.

2. In an engine driven transmission, the combination of plural drive trains for establishing different drive ratios through the transmission, each train including a fluid operated drive establishing device for rendering the respective drive train effective, a fluid pressure source, control valving for controlling the drive ratio including a manually operable drive range selector valve movable to select neutral or any one of a plurality of drive range conditions of operation and including a hydraulically controlled shift valve movable to establish change of forward drive ratio, a line pressure regulator valve normally effective to maintain a predetermined line pressure supply to said control valving, fluid pressure responsive means associated with said pressure regulator valve effective in response to fluid pressure for reducing the line pressure supplied by said pressure regulator valve below said normal predetermined line pressure, a pressure drop valve for controlling the pressure supplied to said fluid pressure responsive means, and supplied with line pressure when said drive range selector valve is placed to select one of said drive range conditions of operation or neutral, manually operable means for controlling said pressure drop valve to progressively decrease the pressure supplied to said fluid pressure responsive means by said pressure drop valve in response to increase in torque demand, additional fluid pressure responsive means associated with said pressure regulator valve for boosting the line pressure above said predetermined normal line pressure, and valve means including said hydraulically controled shift valve for controlling the admission of fluid pressure to said last-mentioned fluid pressure responsive means.

3. In an engine driven transmission, the combination of plural drive trains for establishing different drive ratios through the transmisison, each train including a fluid operated drive establishing device for rendering the respective drive train effective, a fluid pressure source, control valving for controlling the drive ratio including a manually operable drive range selector valve movable to select neutral or any one of a plurality of drive range condtions of operation and a hydraulically controlled shift valve movable to establish change of forward drive ratio, a line pressure regulator valve normally effective to maintain a predetermined line pressure supply to said control valving, fluid pressure responsive means associated with said pressure regulator valve effective in response to fluid pressure for reducing the line pressure supplied by said pressure regulator valve below said normal predetermined line pressure, a pressure drop valve for controlling the pressure supplied to said fluid pressure responsive means and supplied with line pressure when said drive range selector valve is placed to select one of said drive range conditions of operation or neutral, an additional manually operable valve for controlling said pressure drop valve to progressively decrease the pressure supplied to said fluid pressure responsive means by said pressure drop valve in response to increase in torque demand, additional fluid pressure responsive means associated with said pressure regulator valve for boosting the line pressure above said predetermined normal pressure, and means including a pressure boost valve and said hydraulically controlled shift valve for controlling the admission of pressure to said additional fluid pressure responsive means.

4. In an engine driven transmission, the combination of plural drive trains for establishing different drive ratios through the transmisison, each train including a fluid operated drive establishing device for rendering the respective drive train effective, a fluid pressure source, control valving for controlling the drive ratio including a manually operable drive range selector valve movable to select neutral or any one of a plurality of drive range conditions of operation and a hydraulically controlled shift valve movable to establish change of forward drive ratio, a line pressure regulator valve normally effective to maintain a predetermined line pressure supply to said control valving, fluid pressure responsive means associated with said pressure regulator valve effective in response to fluid pressure for reducing the line pressure supplied by said pressure regulator valve below said normal predetermined line pressure, a pressure drop valve for controlling the pressure supplied to said fluid pressure responsive means and supplied with line pressure when said drive range selector valve is placed to select one of said drive range conditions to operation or neutral, manually operable means for controlling said pressure drop valve to pregressively decrease the pressure supplied to said fluid pressure responsive means by said pressure drop valve in reponse to increase in the torque demand, additional fluid pressure responsive means associated with said pressure regulator valve for boosting the line pressure above said predetermined normal line pressure, and valve means including said hydraulically controlled shift valve for controlling the admission of fluid pressure to said last-mentioned fluid pressure responsive means, said last mentioned valve means being effective when said drive range selector valve is positioned for neutral operation to block off the flow of fluid to said additional fluid pressure responsive means and effective when said drive range selector valve is moved from its neutral position to select one of said drive range conditons of operation to direct fluid to said additional fluid pressure responsive means, said valve means being effective upon movement of said shift valve to a second position to connect said additonal fluid pressure responsive means to exhaust.

5. In an engine driven transmission, the combination of plural drive trains for establishing different drive ratios through the transmission, each train including a fluid operated drive establishing device for rendering the respective drive train effective, a fluid pressure source, control valving for controlling the drive ratio including a manually operable drive range selector valve adapted to be positioned to select neutral or any one of a plurality of drive range conditions of operation and a hydraulically controlled shift valve movable to establish change of forward drive ratio, a line pressure regulator valve normally effective to maintain a predetermined pressure supply to said control valving, fluid pressure responsive means associated with said pressure regulator valve for reducing the pressure supply to said control valving, a pressure metering valve adapted to deliver variable pressure to said fluid pressure responsive means, manually operable means for controlling the action of said variable pressure metering valve to progressively decrease the pressure delivered by said pressure metering valve in response to increase in torque demand, said drive range selector valve being effective in one drive range position to admit fluid pressure to said variable pressure metering valve and effective in a second position to block off the supply of fluid to said variable metering delivery valve, a second fluid pressure responsive means effective to boost the line pressure delivered to said control valving by said line pressure regulator valve, a pressure boost valve for controlling the admission of fluid pressure to said second fluid pressure responsive means, said pressure boost valve being effective when said drive range selector valve is positioned for neutral operation to block off the supply of fluid pressure to said second fluid pressure responsive means and effective upon movement of said drive range selector valve to one of said drive range condition of operation to deliver fluid pressure to said second fluid pressure responsive means, said hydraulically controlled shift valve being effective upon movement to its upshift position to deliver fluid to said pressure boost valve to position said pressure boost valve to connect said second fluid pressure responsive means to exhaust.

6. In an engine driven transmission, the combination of plural drive trains for establishing neutral and a plurality of drive ratios, each train including a fluid pressure operated drive establishing device for rendering the respective drive train effective, a fluid pressure source, control valving for controlling the drive ratio including a manually operable drive range selector valve adapted to be positioned to select neutral or any one of a plurality of drive range conditions of operation and a fluid pressure actuated shift valve movable to establish change of forward drive ratio, a line pressure regulator valve normally effective to maintain a predetermined line pressure supply to said control valving, fluid pressure responsive means associated with said pressure regulator valve for reducing the pressure supply to said control valving, a pressure drop valve adapted to deliver variable pressure to said fluid pressure responsive means, manually operable means for controlling said pressure drop valve to progressively decrease the pressure supplied to said fluid pressure responsive means in respone to increase in torque demand, said drive range selector valve being effective in one drive range position to deliver line pressure to said pressure drop valve and effective in a second drive range position to block off the supply of line pressure to said pressure drop valve, a second fluid pressure responsive means effective to boost the line pressure delivered by said line pressure regulator valve, a pressure boost valve for controlling the admission of fluid pressure to said second fluid pressure responsive means, said pressure boost valve being effective when said drive range selector valve is positioned for neutral operation to block off the flow of line pressure to said second fluid pressure responsive means, said pressure boost valve being effective when said drive range selector valve is positioned in one drive range position and said control valving is effective to establish one transmission drive ratio to admit line pressure to said second fluid pressure responsive means, said pressure boost valve being effective when said drive range selector valve is disposed in said one drive range position and said hydraulically controlled shift valve is effective to establish a second forward transmission drive ratio to block off the supply of fluid pressure to said second fluid pressure responsive means.

7. In an engine driven transmission, the combination of plural drive trains for establishing neutral and a plurality of drive ratios, each train including a fluid pressure operated drive establishing device for rendering the respective drive train effective, a fluid pressure source, control valving for controlling the drive ratio including a manually operable drive range selector valve adapted to be positioned to select neutral, and first and second drive range conditions of operation, said control valving being operable to progressively establish first, second, and third gear drive through said transmission both when said drive range selector valve is positioned to establish said first drive range and when said selector valve is positioned to establish said second drive range condition of operation, a line pressure regulator valve normally effective to maintain a predetermined line pressure supply to said control valving, first fluid pressure responsive means associated with said line pressure regulator valve for reducing the pressure supply to said control valving, a pressure drop valve for delivering variable pressure to said first fluid pressure responsive means to reduce the pressure supply to said control valving, second fluid pressure responsive means associated with said line pressure regulator valve for boosting the line pressure supplied to said control valving, a pressure boost valve for controlling the admission of line pressure to said second fluid pressure responsive means, said pressure boost valve being effective to deliver pressure to said second fluid pressure responsive means when said control valving is effective to establish low gear drive and said drive range selector valve is positioned to select either said first or second drive range conditions of operation, said pressure drop valve being effective to deliver variable pressure to said first fluid pressure responsive means when said drive range selector valve is positioned to select said first drive range condition of operation irrespective of the transmission drive ratio, said pressure drop valve being blocked off from line pressure when said drive range selector valve is positioned to select said second drive range condition of operation and said control valving is effective to establish either second or third gear operation, and manually operable means for controlling the operation of said pressure drop valve.

8. In an engine driven transmission, the combination of plural drive trains for establishing neutral and a plurality of drive ratios, each train including fluid pressure operated drive establishing device for rendering the respective drive train effective, a fluid pressure source, control valving for controlling the drive ratio including a manually operable drive range selector valve adapted to be positioned to select neutral, drive range, and intermediate range conditions of operation, said control valving being operable to progressively establish, first, second and third gear drive through said transmission both when said drive range selector valve is positioned in its drive range position and in its intermediate range position, a line pressure regulator valve normally effective to maintain a predetermined line pressure supply to said control valving, first fluid pressure responsive means associated with said pressure regulator valve for reducing the pressure supply to said control valving, a pressure drop valve for delivering variable fluid pressure to said first fluid pressure responsive means to reduce the pressure supply to said control valving, said pressure drop valve being effective to deliver said variable pressure to said first fluid pressure responsive means irrespective of the transmission drive ratio when said drive range selector valve is placed for drive range operation and in first gear only when said drive range selector valve is positioned for intermediate range operation, second fluid pressure responsive means associated with said pressure regulator valve for boosting the line pressure supplied to said control valving, a pressure boost valve for controlling the admission of fluid pressure to said second fluid pressure responsive means, said pressure boost valve being effective to deliver pressure to said second fluid pressure responsive means when said transmission is conditioned for first gear operation and said drive range selector valve is positioned for either drive range or intermediate range operation and ineffective to deliver pressure to said second fluid pressure responsive means upon a change of drive ratio to either second or third gear, and manually operable means for controlling said pressure drop valve to vary the pressure delivered by said pressure drop valve to said first fluid pressure responsive means.

9. In a transmission, the combination of plural drive trains for establishing neutral and a plurality of drive ratios, each train including a fluid pressure operated drive establishing device for rendering the drive train effective, a fluid pressure source, control valving for controlling the drive ratio including a manually operable drive range selector valve adapted to be positioned to select neutral, drive range, and intermediate range of operation, said control valving being operable to progressively establish first, second and third gear drive ratio when said drive range selector valve is positioned in its drive range position and its intermediate range position, a line pressure regulator valve normally effective to maintain a predetermined line pressure supply to said control valving, first fluid pressure responsive means for reducing the line pressure supplied by said pressure regulator valve, second fluid pressure responsive means for boosting the line pressure supplied by said pressure regulator valve, a pressure boost valve effective to deliver fluid pressure to said second fluid pressure responsive means when said control valving is effective to establish first gear drive ratio, a pressure drop valve effective to deliver variable pressure to said first fluid pressure responsive means when said control valving is effective to establish neutral, first gear, second gear and third gear drive range operation, said pressure drop valve being effective to deliver variable pressure to said first fluid pressure responsive means when said control valving is effective to establish first gear intermediate range operation and to connect said first fluid pressure responsive means to exhaust when said control valving is effective to establish second gear and third gear intermediate drive range operation, and manually operable means for controlling said pressure drop valve to vary the pressure delivered to said first fluid pressure responsive means by said pressure drop valve.

10. In a transmission, the combination of plural drive trains for establishing neutral and a plurality of drive ratios including first, second and third gear, means for establishing first gear drive ratio including a neutral clutch and a fluid coupling of the type adapted to be alternately filled with and emptied of working fluid, means for establishing second gear drive ratio including a gear unit clutch, means for establishing a third gear drive ratio including said fluid coupling and said gear unit clutch, a fluid pressure source, means for controlling the admission of fluid pressure to said neutral clutch and to said fluid coupling to establish first gear drive ratio including a first to second shift valve and a manually operable drive range selector valve, means for controlling shift of drive ratio from second to third speed including a second to third shift valve, said first to second shift valve being effective in its first gear position to deliver fluid to said coupling to fill said coupling and effective in its second gear position to permit said coupling to be connected to exhaust, said first to second gear shift valve being effective in its second gear position to deliver pressure to said gear unit clutch and effective in its first gear position to connect said gear unit clutch to exhaust, said second to third shift valve being effective in its third gear position to deliver fluid to fill said coupling and effective in its second gear position to block off the supply of fluid to said coupling, an additional valve for providing rapid exhaust of said gear unit clutch, and manually operable means for controlling the operation of said additional valve.

11. In a transmission, the combination of plural drive trains for establishing neutral and a plurality of drive ratios including first, second and third gear, means for establishing first gear drive ratio including a neutral clutch and a fluid coupling of the type adapted to be alternately filled with and emptied of working fluid, means for establishing second gear drive ratio including a gear unit clutch, means for establishing a third gear drive ratio including said fluid coupling and said gear unit clutch, a fluid pressure source, means for controlling the admission of fluid pressure to said neutral clutch and to said fluid coupling to establish first gear drive ratio including a first to second shift valve and a manually operable drive range selector valve, means for controlling shift of drive ratio from second to third speed including a second to third shift valve, said first to second shift valve being effective in its first gear position to deliver fluid to said coupling to fill said coupling and effective in its second gear position to permit said coupling to be connected to exhaust, said first to second gear shift valve being effective in its second gear position to deliver pressure to said gear unit clutch and effective in its first gear position to connect said gear unit clutch to exhaust, said second to third shift valve being effective in its third gear position to deliver fluid to fill said coupling and effective in its second gear position to block off the supply of fluid to said coupling, an additional valve for providing rapid exhaust of said gear unit clutch, a manually operable valve for delivering variable pressure to said additional valve for controlling the action of said additional valve, said additional valve being effective upon a drop in pressure of said variable pressure below a predetermined pressure to connect said gear unit clutch to exhaust when said first to second shift valve is positioned to select first gear drive ratio.

12. In a transmission, the combination of plural drive trains for establishing neutral, first, second, and third gear, means for establishing first gear drive including a neutral clutch and a fluid coupling of the type adapted to be alternately filled with and emptied of working fluid, means for establishing second gear drive including a gear unit clutch, means for establishing third gear drive including said fluid coupling and said gear unit clutch, a fluid pressure source, means for controlling the admission of fluid pressure to said neutral clutch and to said fluid coupling to establish first gear drive including a first to second gear shift valve and a manually operable drive range selector valve, said first to second shift valve being effective in a downshift position to connect said gear unit clutch to exhaust through a restricted exhaust port and to deliver fluid pressure for filling said coupling with fluid, said first to second shift valve being effective in an upshift position to deliver fluid pressure to said gear unit clutch to engage the same, a second to third shift valve effective in a downshift position to block off supply of pressure from said fluid coupling and effective in an upshift position to deliver fluid to said coupling to fill the same, and a gear unit clutch exhaust valve responsive to a predetermined rise in pressure in said fluid coupling to connect said gear unit clutch to exhaust through an unrestricted exhaust port.

13. In a transmission, the combination of plural drive trains for establishing neutral, first, second, and third gear, means for establishing first gear drive including a neutral clutch and a fluid coupling of the type adapted to be alternately filled with and emptied of working fluid, means for establishing second gear drive including a gear unit clutch, means for establishing third gear drive including said fluid coupling and said gear unit clutch, a fluid pressure source, means for controlling the admission of fluid pressure to said neutral clutch and to said fluid coupling to establish first gear drive including a first to second gear shift valve and a manually operable drive range selector valve, said first to second shift valve being effective in a downshift position to connect said gear unit clutch to exhaust through a restricted exhaust port and to deliver fluid pressure for filling said coupling with fluid, said first to second shift valve being effective in an upshift position to deliver fluid pressure to said gear unit clutch to engage the same, a second to third shift valve effective in a downshift position to block off supply of pressure from said fluid coupling and effective in an upshift position to deliver fluid to said coupling to fill the same, a gear unit clutch exhaust valve responsive to a predetermined rise in pressure in said fluid coupling to permit rapid exhaust of said gear unit clutch through an unrestricted exhaust port when said first to second shift valve is in its downshift position, an additional valve for providing rapid exhaust of said gear unit clutch when said shift valves are moved to their downshift positions.

14. In a transmission, the combination of plural drive trains for establishing neutral, first, second, and third gears, means for establishing first gear drive including a neutral clutch and a fluid coupling of the type adapted to be alternately filled and emptied of working fluid, means for establishing second gear drive including a gear unit clutch, means for establishing third gear drive including said fluid coupling and said gear unit clutch, a fluid pressure source, means for controlling the admission of fluid pressure to said neutral clutch and to said fluid coupling to establish first gear drive including a first to second gear shift valve and a manually operable drive range selector valve, said first to second shift valve being effective in a downshift position to connect said gear unit clutch to exhaust through a restricted exhaust port and to deliver fluid pressure for filling said coupling with fluid, said first to second shift valve being effective in an upshift position to deliver fluid pressure to said gear unit clutch to engage the same, a second to third shift valve effective in a downshift position to block off supply of pressure from said fluid coupling and effective in an upshift position to deliver fluid to said coupling to fill the same, a gear unit clutch exhaust valve responsive to a predetermined rise in pressure in said fluid coupling to permit rapid exhaust of said gear unit clutch through an unrestricted exhaust port when said first to second shift valve is in its downshift position, an additional valve for providing rapid exhaust of said gear unit clutch when said shift valves are moved to their downshift positions, and a manually operable pressure metering valve adapted to deliver variable pressure to said additional valve for controlling the action of said additional valve.

15. In a transmission, the combination of plural drive trains for establishing a plurality of forward drive ratios, each drive train including a fluid pressure operated drive establishing device for rendering the drive train effective, a fluid pressure source, control valving for controlling the transmission drive ratio and effective to establish first, second, and third gear drive ratios, a line pressure regulator valve normally effective to maintain a predetermined line pressure to said control valving, fluid pressure responsive means for dropping the pressure supplied to said control valving by said pressure regulator valve, a pressure drop valve for controlling the admission of fluid pressure to said fluid pressure responsive means, a second to third gear boost valve, a cut-off valve, a manually operable pressure metering valve adapted to deliver variable pressure to said pressure drop valve and to said cut off valve to control the action of said valves, said pressure drop valve being normally effective upon a drop in pressure delivered by said pressure metering valve to deliver a variable pressure to said fluid pressure responsive means to decrease the line pressure supplied to said control valving, said cut off valve being effective during a shift from second to third gear drive ratio upon a drop in pressure delivered by said manually operable pressure metering valve below a predetermined pressure to deliver pressure to said second to third gear boost valve, said last mentioned valve being effective in response to pressure delivered thereto by said cut off valve to deliver full line pressure to said pressure drop valve to position said pressure drop valve to connect said fluid pressure responsive means to exhaust.

16. In a transmission, the combination of plural drive trains for establishing a plurality of forward drive ratios, each drive train including a fluid pressure operated drive establishing device for rendering the drive train effective, a fluid pressure source, control valving for controlling the transmission drive ratio and effective to establish first, second, and third gear drive ratios, a line pressure regulator valve normally effective to maintain a predetermined line pressure to said control valving, fluid pressure responsive means for dropping the pressure supplied to said control valving by said pressure regulator valve, a pressure drop valve for controlling the admission of fluid pressure to said fluid pressure responsive means, a second to third gear boost valve, a cut-off valve, a manually operable pressure metering valve adapted to deliver variable pressure to said pressure drop valve and to said cut-off valve to control the action of said valves, said pressure drop valve being normally effective upon a drop in pressure delivered by said pressure metering valve to deliver a variable pressure to said fluid pressure responsive means to decrease the line pressure supplied to said control valving, said cut off valve being effective during a shift from second to third gear drive ratio upon a drop in pressure delivered by said manually operable pressure metering valve below a predetermined pressure to deliver pressure to said second to third gear boost valve, said last mentioned valve being effective in response to pressure delivered thereto by said cut off valve to deliver full line pressure to said pressure drop valve to position said pressure drop valve to connect said fluid pressure responsive means to exhaust, said pressure boost valve being moved in reponse to fluid pressure supplied to one of said drive establishing devices to block off said pressure drop valve from said full line pressure upon completion of shift of drive ratio to third gear drive.

17. In an engine driven transmission, the combination of plural drive trains for establishing a plurality of transmission drive ratios, each train including a fluid pressure operated drive establishing device for rendering said drive train effective, a fluid pressure source, control valving for controlling the transmission drive ratio, said control valving being effective to deliver fluid pressure to one of said drive establishing devices to establish first gear drive ratio and to a second drive establishing device to establish a second drive ratio, an accumulator responsive to pressure delivered to said second drive establishing device for controlling the rate of engagement of said second drive establishing device, means for controlling the action of said accumulator including first and second pressure metering valves, said first pressure metering valve being manually operable to deliver variable pressure to a first control chamber associated with said second pressure metering valve to control the action of said second pressure metering valve, said second pressure metering valve including a line pressure supply port and a pressure delivery port associated with said second pressure metering valve, a passage connecting said pressure delivery port to said accumulator, a second control chamber associated with said second pressure metering valve connected to said passage, spring means acting in assistance to pressure in said first control chamber for biasing said second pressure metering valve to connect said line pressure supply port to said delivery port, the pressure in said second control chamber acting in opposition to said pressure in said first chamber and said spring to bias said second pressure metering valve to block off said line pressure supply port from said pressure delivery port, an additional plunger in axial alignment with said second pressure metering valve, a control chamber associated with said plunger connected to said pressure delivery passage, the pressure in said last-mentioned control chamber tending to bias said plunger to assist the pressure in said second control chamber to bias said second pressure metering valve to block off said pressure delivery port from said line pressure supply port, and means biasing said plunger to oppose the action of fluid pressure in the control chamber associated with said plunger.

18. In an engine driven transmission, the combination of plural drive trains for establishing a plurality of transmission drive ratios, each drive train including a fluid pressure operated drive establishing device for rendering said drive train effective, a fluid pressure source, control valving for controlling the drive ratio, said control valving being effective to deliver fluid pressure to one of said drive establishing devices to establish one drive ratio and effective to deliver fluid pressure to a second of said drive establishing devices to establish a second drive ratio, an accumulator responsive to pressure delivered to one of said drive establishing devices to control the rate of engagement of said one drive establishing device, means for controlling said accumulator including a first manually operable pressure metering valve and a second pressure metering valve, said second pressure metering valve being controlled by said first pressure metering valve, said manually operable pressure metering valve being effective to deliver variable pressure which varies with changes in engine torque demand, said second pressure metering valve including a first control chamber connected to fluid pressure delivered by said first pressure metering valve, a line pressure supply port, pressure delivery port, a passage connecting said pressure delivery port to said accumulator, spring means assisting the pressure in said first control chamber to bias said valve to connect said line pressure supply port to said pressure delivery port, a second control chamber associated with said second pressure metering valve connected to pressure delivered by said second pressure metering valve, the pressure in said second control chamber biasing said second pressure metering valve to block off said pressure delivery passage from said line pressure port, a plunger in axial alignment with second pressure metering valve, said plunger including a first land responsive to fluid pressure in said second control chamber and a second land of greater diameter than said first land, a third control chamber associated with said plunger and connected to fluid delivered by said second pressure metering valve, the pressure in said third control chamber acting on said second land to bias said plunger to move said second pressure metering valve to block off said line pressure supply port from said passage, and spring means operative on said plunger for preventing said plunger from moving said second pressure metering valve until a predetermined pressure is delivered to said third control chamber.

References Cited in the file of this patent
UNITED STATES PATENTS

| | | |
|---|---|---|
| 2,722,296 | Stoeckicht | Nov. 1, 1955 |
| 2,732,732 | Borman | Jan. 31, 1956 |
| 2,769,350 | Lucia et al. | Nov. 6, 1956 |
| 2,770,148 | Wayman | Nov. 13, 1956 |
| 2,809,536 | O'Malley | Oct. 15, 1957 |
| 2,865,227 | Kelley et al. | Dec. 23, 1958 |
| 2,895,344 | Holdeman | July 21, 1959 |
| 2,896,468 | Cheek et al. | July 28, 1959 |
| 2,919,597 | Borman | Jan. 5, 1960 |
| 2,919,603 | Livermore | Jan. 5, 1960 |
| 3,004,446 | Flinn | Oct. 17, 1961 |
| 3,046,809 | Snyder | July 31, 1962 |
| 3,077,122 | Olsen | Feb. 12, 1963 |

UNITED STATES PATENT OFFICE
CERTIFICATE OF CORRECTION

Patent No. 3,132,535  May 12, 1964

August H. Borman, Jr., et al.

It is hereby certified that error appears in the above numbered patent requiring correction and that the said Letters Patent should read as corrected below.

Column 4, line 36, before "gear", second occurrence, insert -- rear --; column 5, line 74, for "one", first occurrence, read -- on --; column 7, line 44, strike out "is"; column 9, line 16, for "about" read -- abut --; line 23, before "240" insert -- valve --; line 49, for "Section", in italics, read -- Second --, in italics; column 10, line 41, for "Port" read -- Ports --; column 11, line 13, for "suppleid" read -- supplied --; column 14, line 26, for "350" read -- 305 --; column 23, line 52, after "operable" insert -- valve being effective when said drive range selector --; column 24, line 75, for "to" read -- of --; column 25, line 2, for "pregressively" read -- progressively --; line 45, for "metering delivery valve" read -- pressure metering valve --; column 32, line 16, after "pressure" insert -- supply --.

Signed and sealed this 10th day of November 1964.

(SEAL)
Attest:

ERNEST W. SWIDER
Attesting Officer

EDWARD J. BRENNER
Commissioner of Patents